United States Patent
Seno

(10) Patent No.: US 8,924,683 B2
(45) Date of Patent: Dec. 30, 2014

(54) STORAGE APPARATUS AND DATA CONTROL METHOD USING A RELAY UNIT AND AN INTERFACE FOR COMMUNICATION AND STORAGE MANAGEMENT

(75) Inventor: Shuntaro Seno, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 909 days.

(21) Appl. No.: 13/127,958

(22) PCT Filed: Apr. 21, 2011

(86) PCT No.: PCT/JP2011/002341
§ 371 (c)(1),
(2), (4) Date: May 5, 2011

(87) PCT Pub. No.: WO2012/143975
PCT Pub. Date: Oct. 26, 2012

(65) Prior Publication Data
US 2012/0272035 A1    Oct. 25, 2012

(51) Int. Cl.
*G06F 13/00* (2006.01)
*G06F 13/28* (2006.01)
*G06F 12/00* (2006.01)
*G06F 13/40* (2006.01)

(52) U.S. Cl.
CPC .... *G06F 13/4022* (2013.01); *G06F 2213/0026* (2013.01)
USPC ........... 711/173; 711/170; 711/171; 711/172; 711/129; 711/E12.046

(58) Field of Classification Search
None
See application file for complete search history.

(56) References Cited

U.S. PATENT DOCUMENTS

| 7,009,988 | B2 * | 3/2006 | Han et al. | 370/412 |
| 7,308,523 | B1 * | 12/2007 | Ngai | 710/313 |
| 2003/0135579 | A1 * | 7/2003 | Han et al. | 709/215 |
| 2006/0173986 | A1 * | 8/2006 | Ikeda et al. | 709/223 |
| 2008/0091789 | A1 * | 4/2008 | Kimiyama et al. | 709/212 |

FOREIGN PATENT DOCUMENTS

JP    2006-195871 A    7/2006

* cited by examiner

*Primary Examiner* — Edward Dudek, Jr.
*Assistant Examiner* — Matthew Chrzanowski
(74) *Attorney, Agent, or Firm* — Foley & Lardner LLP

(57) ABSTRACT

The relay unit splits the storage area in the buffer into a plurality of partitioned areas, manages the same and, upon receiving a read request from the access request source, selects and allocates one or more from the plurality of partitioned areas and, on condition that the relevant partitioned areas are allocated, transmits the read request to the memory control unit, wherein the memory control unit reads the data requested in the received read request from the memory, splits the data which is read into a plurality of units, and transmits the same to the relay unit, wherein the relay unit stores each of the data transmitted from the memory control unit in each of the allocated partitioned areas sequentially, on condition that all of the data is stored, reads each of the data from each of the allocated partitioned areas, compiles each of the data which is read into one, transmits the same as read data to the access request source, and releases all of the respective allocated partitioned areas.

14 Claims, 18 Drawing Sheets

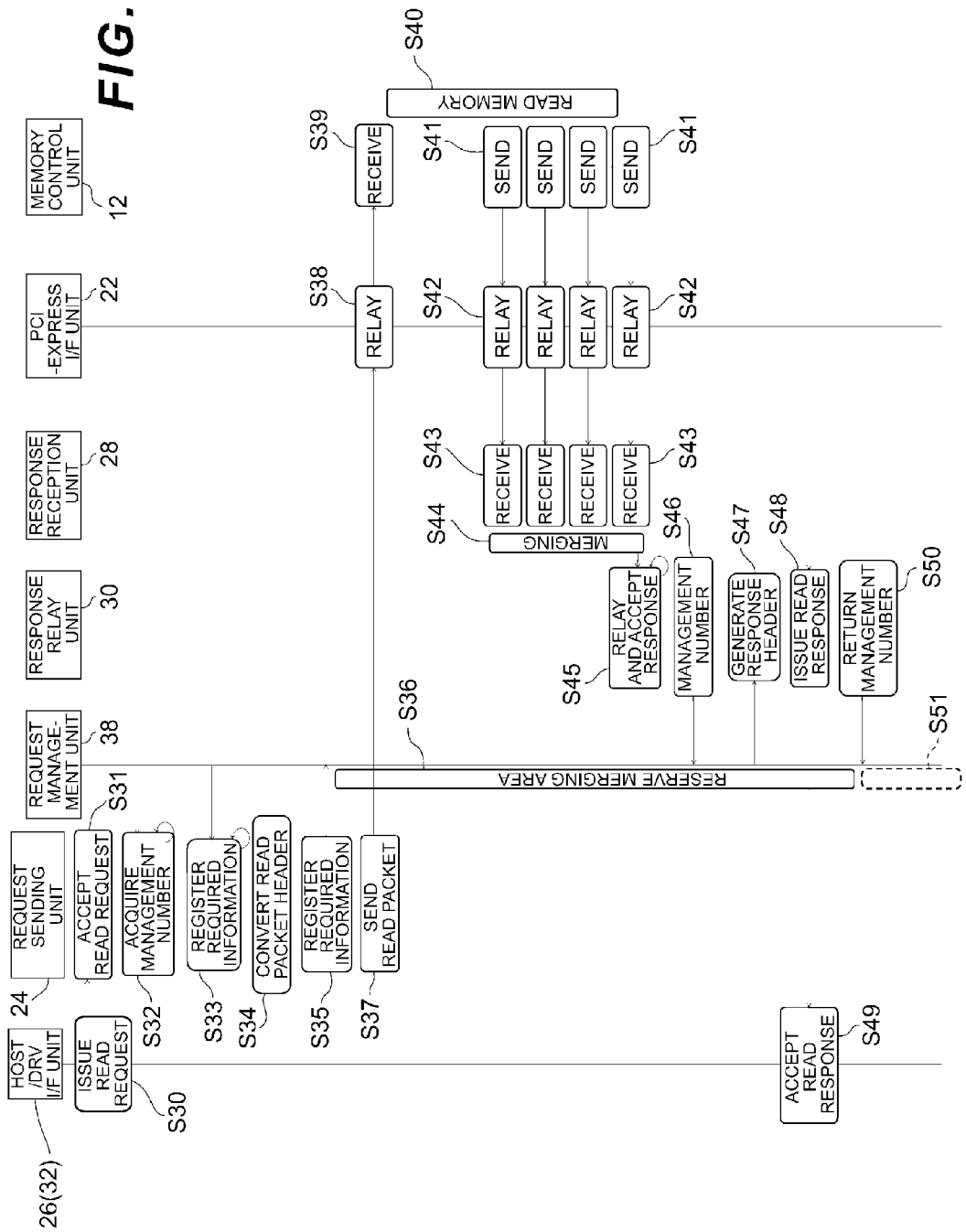

STORAGE APPARATUS AND DATA CONTROL METHOD USING A RELAY UNIT AND AN INTERFACE FOR COMMUNICATION AND STORAGE MANAGEMENT

TECHNICAL FIELD

The present invention relates to a storage apparatus and a data control method of the same in which a high-speed interface is used in a data transmission path for communicating data with a host computer or a storage device.

BACKGROUND ART

There is a storage apparatus which adopts a method in which data from a host computer is temporarily stored in a cache memory in accordance with an access request from the host computer, subsequently the data stored in the cache memory is stored in a storage device and, if the data requested in the read request from the host computer exists in the cache memory, the data stored in the cache memory is transferred to the host computer.

In this type of storage apparatus, for speeding up data transmission, a high-speed interface represented by, for example, PCI-Express (registered trademark) is sometimes used as an interface of the data transmission path connecting a micro-processor which controls the cache memory with a relay unit communicating data with the host computer or the storage device.

If the high-speed interface is used, the request side which issues a read request, a host computer for example, transmits a read request including a management number, a data transfer length, and an address as a packet to the response side. The response side, a microprocessor managing the cache memory for example, reads the data requested in the read request from the cache memory, applies the read data to the maximum transfer length of the high-speed interface, and transmits the same to the request side. Here, if the response side adopts split completion, the microprocessor on the response side splits the read data into a plurality of units by, for example, a 64 B (byte) boundary (address boundary) or a 128 B boundary, and sequentially transmits the split units of data to the request side in numerical order of the addresses.

For example, if the maximum transfer length of the high-speed interface is 1 kB and a 4 kB data is requested in a read request, the microprocessor on the response side splits the data read from the cache memory (the 4 kB data) into four or more units, adds each of the split data as a completion data equal to or smaller than 1 kB to a packet in numerical order of the addresses, and transmits the same.

Meanwhile, if Out Of Order is adopted on the response side, each time a read request is received from the request side, the microprocessor on the response side can split the data requested in each of the read requests into a plurality of units of data and transmit each of the split data to the request side in random order regardless of the order of reception of the respective read requests.

However, the data which is split in accordance with the same read request is sequentially transmitted to the request side in numerical order of the addresses.

In this case, if the microprocessor on the response side accepts a second read request after receiving a first read request and a 4 kB data is required respectively by each of the read requests, the microprocessor on the response side can read the data requested in each of the read requests from the cache memory, split each of the read data (4 kB data) into 1 kB units, and transmit each of the split data as a 1 kB completion data to the request side in random order regardless of the order of reception of the respective read requests.

For example, each of the data requested in the first read request and the data requested in the second read request can be alternately transmitted as a 1 kB completion data. Furthermore, after the data requested in the second read request is transmitted as a 1 kB completion data, it is also possible to transmit the data requested in the first read request as a 1 kB completion data.

Furthermore, as an apparatus using a high-speed interface, for example, a communication apparatus comprising a transmission circuit which transmits transmission data to the other destination, a receiver circuit which receives received data from the other destination, a storage device as a transfer buffer which performs buffering for the transmission data and receiver buffer which performs buffering for the reception data, and an address mapping means for performing address mapping for the transmission buffer and the receiver buffer in the storage device and changing the storage capacity of each of the transmission buffer and the reception buffer is proposed (refer to Patent Literature 1).

CITATION LIST

Patent Literature

PTL 1: Japanese Patent Application Laid-Open (Kokai) No. 2006-195871

SUMMARY OF INVENTION

Technical Problem

If split completion is applied to the high-speed interface, the method in which the processing (merging processing) of coupling a plurality of data (completion data) transmitted from the response side is not performed in the relay unit which is located between the response side and the request side and relays data of the both sides may be adopted. In this case, though the circuit area can be reduced in the relay unit since a plurality of split data can be transferred as is to the request side, the number of transferred packets increases, which causes overhead in data transfer and deteriorates the throughput performance.

Meanwhile, if split completion is applied to the high-speed interface and the method in which the processing (merging processing) of coupling a plurality of data (completion data) is performed in the relay unit is adopted, the relay unit transfers the plurality of split data collectively per read request to the request side, therefore the number of transferred packets is reduced, the overhead in data transfer is reduced, and the throughput performance can be improved, but the circuit area is increased.

Here, attempts have been made to locate buffers in the relay unit which comprise a plurality of memory areas capable of storing the maximum required size of data, statically secure the memory area in each of the buffers per read request, store the data corresponding to the read request in the memory area of each of the buffers, and transfer the data stored in the memory area of each of the buffers collectively as the read data to the request side.

If this method is adopted, the circuit structure is simplified while, since the memory area of each of the buffers is allocated per read request, once the number of read requests reaches the number of memory areas, it becomes impossible to secure the memory areas for the subsequent read requests.

Therefore, the relay unit cannot issue any subsequent read requests to the response side. Furthermore, since the memory area of a fixed capacity is allocated even if the capacity of the data requested in the read request is small, the buffer use efficiency is deteriorated. In this case, for improving the buffer use efficiency, the memory area of the buffer must be extended. However, if the memory area of the buffer is extended, the circuit area (cost) will increase by that much.

Meanwhile, attempts have been made to provide a buffer in the relay unit for storing the data from the response side, dynamically secure the memory area in this buffer capable of storing the data requested in the read request for each read request with a sequential address, and transfer the data stored in each of the memory areas collectively as the read data to the request side.

If this method is adopted, the memory area of the buffer is allocated dynamically for storing the exact amount of the data requested in each of the read requests, which makes it possible to store the data requested in more read requests in the buffer than by the above-mentioned method. Furthermore, if Out of Order does not occur, the memory area of the buffer can be utilized efficiently even if the capacity of the data requested in the read request is small, and the buffer use efficiency can be improved.

However, since the memory areas in the buffers are allocated with sequential addresses, if free areas exist separately in the memory areas of the buffers and the addresses of the respective separate areas are non-sequential and if the capacity of the data requested in the read request is not sufficient in one memory area, the data requested in the subsequent read requests can be stored in all of the free areas, but the memory areas for storing the data requested in the subsequent read requests cannot be allocated as the memory areas of sequential addresses. Therefore, the relay unit cannot issue any subsequent read requests to the response side.

Meanwhile, though changing the data storage area dynamically is described in Patent Literature 1, even changing the data storage area dynamically must be started by resetting the link.

The present invention was devised in view of the problems of the above-mentioned conventional technology. Thus, an object of this invention is to provide a storage apparatus and a data control method of the same capable of improving the buffer use efficiency and enhancing the read performance from the memory.

Solution to Problem

In order to achieve the foregoing object, the present invention comprises a memory for storing data, a relay unit for communicating information with an access request source via the network and also managing a buffer for storing the data stored in the memory, and a memory control unit for communicating information with the relay unit via the interface and also controlling the data input/output processing for the memory, wherein the relay unit splits the storage area in the buffer into a plurality of partitioned areas, dynamically manages each of the relevant partitioned areas and, upon receiving a read request from the access request source, on condition that one or more released partitioned areas are allocated, sends the received read request to the memory control unit, wherein the memory control unit, upon receiving the read request from the relay unit, reads the data requested in the received read request from the memory, splits the data which is read into a plurality of units, and transmits the same to the relay unit, wherein the relay unit further stores each of the received data in each of the allocated partitioned areas sequentially, reads each of the data from each of the partitioned areas on condition that all of the data is stored, and transmits each of the data which is read as read data to the access request source. Here, the relay unit can secure one or more of the released partitioned areas separately and, after transmitting the read data, can release all of the respective allocated partitioned areas.

Advantageous Effects of Invention

According to the present invention, it is possible to improve the buffer use efficiency and enhance the read performance from the memory.

BRIEF DESCRIPTION OF DRAWINGS

FIG. 18 is a flowchart explaining the processing contents of the entire storage apparatus.

DESCRIPTION OF EMBODIMENTS

Concept of Invention

Figure 1:
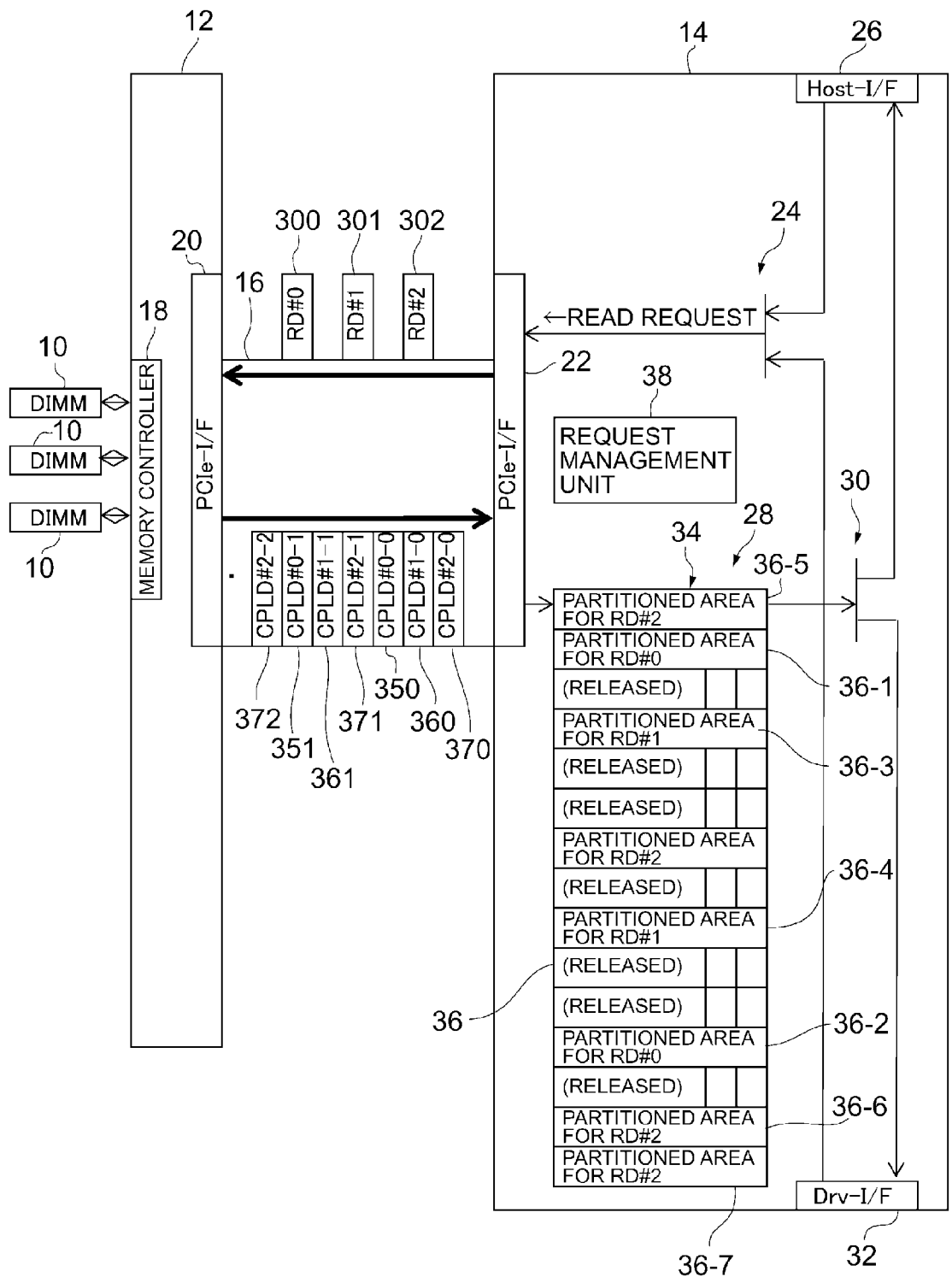
FIG. 1 is a conceptual diagram explaining the concept of the present invention.

FIG. 1 is a conceptual diagram explaining the concept of the present invention. In FIG. 1, the storage apparatus is configured of a plurality of memories 10 for storing data, a memory control unit 12 which controls the data input/output processing for each of the memories 10, and a relay unit 14 which communicates information with a host computer or a storage device as the access request source. Each of the memories 10 and the memory control unit 12 are connected via a data bus, and the memory control unit 12 and the relay unit 14 are connected via a data transmission path 16.

Each of the memories 10 is configured as a cache memory which temporarily stores data.

The memory control unit 12 is configured of a microprocessor unit comprising a memory controller 18 and a high-speed interface 20. The high-speed interface 20 is configured of PCI-Express (registered trademark) for example, and is connected to the data transmission path 16.

The relay unit 14 is configured of a high-speed interface 22, a request sending unit 24, a host interface 26, a response receiver unit 28, a response relay unit 30, a drive interface 32, and a request management unit 38, and a buffer 34 is allocated in the response receiver unit 28.

The high-speed interface 22 is configured of PCI-Express for example, and is connected to the data transmission path 16. The host interface 26 is connected to a host computer (not shown in the figure) via a network (not shown in the figure), and the drive interface 32 is connected to the storage device (not shown in the figure) via an internal network (not shown in the figure).

The request sending unit 24 receives an access request, a read request for example, from the host computer (the source of the first access request) via the host interface 26, also receives an access request, a read request for example, from the storage device (the source of the second access request) via the drive interface 32, and sends the received read request to the memory control unit 12 via the high-speed interface 22 and the data transmission path 16.

Here, the request management unit 38 manages management numbers (e.g. #0, #1, . . . ) provided to the respective read requests for identifying the respective read requests and also performs the processing for storing the read request information added to the respective read requests. If the storage area in the buffer 34 is divided into a plurality of partitioned areas 36, on condition that one or more partitioned areas 36 for storing the data of the length requested in the read request are allocated corresponding to the management numbers provided to the respective read requests, the request sending unit 24 sends the read request to which the management number is added to the memory control unit 12.

For example, on condition that 36-1 and 36-2 are separately allocated in the buffer 34 as partitioned areas 36 for storing the data of the length requested in a #0 read request 300, that partitioned areas 36-3 and 36-4 are separately allocated as partitioned areas 36 for storing the data of the length requested in a #1 read request 301, and that partitioned areas 36-5, 36-6, and 36-7 are separately allocated as partitioned areas 36 for storing the data of the length requested in a #2 read request 302, the request sending unit 24 sends the #0 read request 300, the #1 read request 301, and the #2 read request 302 sequentially to the memory control unit 12.

Each time [any of] the read requests 300, 301, and 302 is received sequentially, the memory control unit 12 reads the data requested in the received request from the memory 10, splits the read data into a plurality of units, adds management numbers which are provided to the read request 300, 301, and 302 to the split data, and transmits the respective data to which the management numbers are added sequentially to the relay unit 14 via the high-speed interface 20 and the data transmission path 16.

For example, the memory control unit 12 splits the data read in accordance with the read request 300 into data 350 and 351, splits the data read in accordance with the read request 301 into data 360 and 361, splits the data read in accordance with the read request 302 into data 370, 371, and 372, adds management numbers to the respective split data 350, 351, 360, 361, and 370 to 372, and sequentially transmits the respective data 350, 351, 360, 361, and 370 to 372 to which the management numbers are added.

Upon receiving each of the data transmitted from the memory control unit 12, the response reception unit 28 determines the management number of each of the received data, and sequentially stores each of the received data to the partitioned area 36 allocated in the buffer 34 in accordance with the determined management number. For example, the response receiver unit 28 stores the received data 350 and 351 in the partitioned areas 36-1 and 36-2 respectively, stores the received data 360 and 361 in the partitioned areas 36-3 and 36-4, and stores the received data 370, 371, and 372 in the partitioned areas 36-5, 36-6, and 36-7.

Here, the response receiver unit 28 structures a plurality of merging areas as virtual storage areas to which sequential virtual addresses are assigned in the virtual memory (not shown in the figure), manages the plurality of partitioned areas 36-1 and 36-2 in one merging area, manages the plurality of partitioned areas 36-3 and 36-4 in one merging area, and manages the plurality of partitioned areas 36-5, 36-6, and 36-7 in one merging area.

Subsequently, in accordance with the management numbers, the response relay unit 30 compiles the data stored in the partitioned areas 36-1 and 36-2 into one read data, also compiles the data stored in the partitioned areas 36-3 and 36-4 into one read data, and furthermore compiles the data stored in the partitioned areas 36-5, 36-6, and 36-7 into one read data respectively. The read data compiled into one is transmitted to the specified access request source for each read request.

For example, if the access request source is a host computer, the response relay unit 30 transmits the read data compiled into one to the host computer via the host interface 26 or, if the access request source is a storage device, transmits the read data compiled into one to the storage device via the drive interface 32.

After the read data is transmitted from the response relay unit 30 to the access request source, the partitioned areas 36 in which the data was stored are released. For example, the partitioned areas 36-1 to 36-7 are released sequentially and become released partitioned areas 36 after the data stored in the relevant partitioned areas is transmitted to the access request sources.

As explained above, in the relay unit 14, each time a read request is received from the access request source, one or more released partitioned areas 36 are selected and allocated from a plurality of partitioned areas 36 as the partitioned areas 36 for storing the data of the length requested in the read request and also the released partitioned areas 36 are separately allocated, and therefore it is possible to secure partitioned areas 36 for storing the data of the length requested in each of the read requests for the plurality of read requests and to transmit a larger number of read requests from the relay unit 14 to the memory control unit 12.

Furthermore, even if the capacity of the data requested in the read request is small, the partitioned areas 36 in the buffer 34 can be utilized efficiently, and the buffer 34 use efficiency can be improved.

Furthermore, since the released partitioned areas 36 are separately allocated in the buffer 34, even in the case of partitioned areas 36 of non-sequential physical addresses, on condition that the partitioned areas 36 of sufficient capacity to store the data of the length requested in a read request exist, partitioned areas 36 for storing the data of the length requested in the relevant read request can be allocated, and the subsequent read request can also be transmitted to the memory control unit 12.

Furthermore, by managing a plurality of partitioned areas 36-1 and 36-2 in one merging area, managing a plurality of partitioned areas 36-3 and 36-4 in one merging area, and managing a plurality of partitioned areas 36-5, 36-6, and 36-7 in one merging area, even if the physical addresses of the respective partitioned areas 36 are non-sequential, the respective partitioned areas can be managed by using the respective merging areas whose virtual addresses are sequential.

Embodiments

Embodiments of the present invention are now explained with reference to the drawings.

(Overall Configuration)

Figure 2:
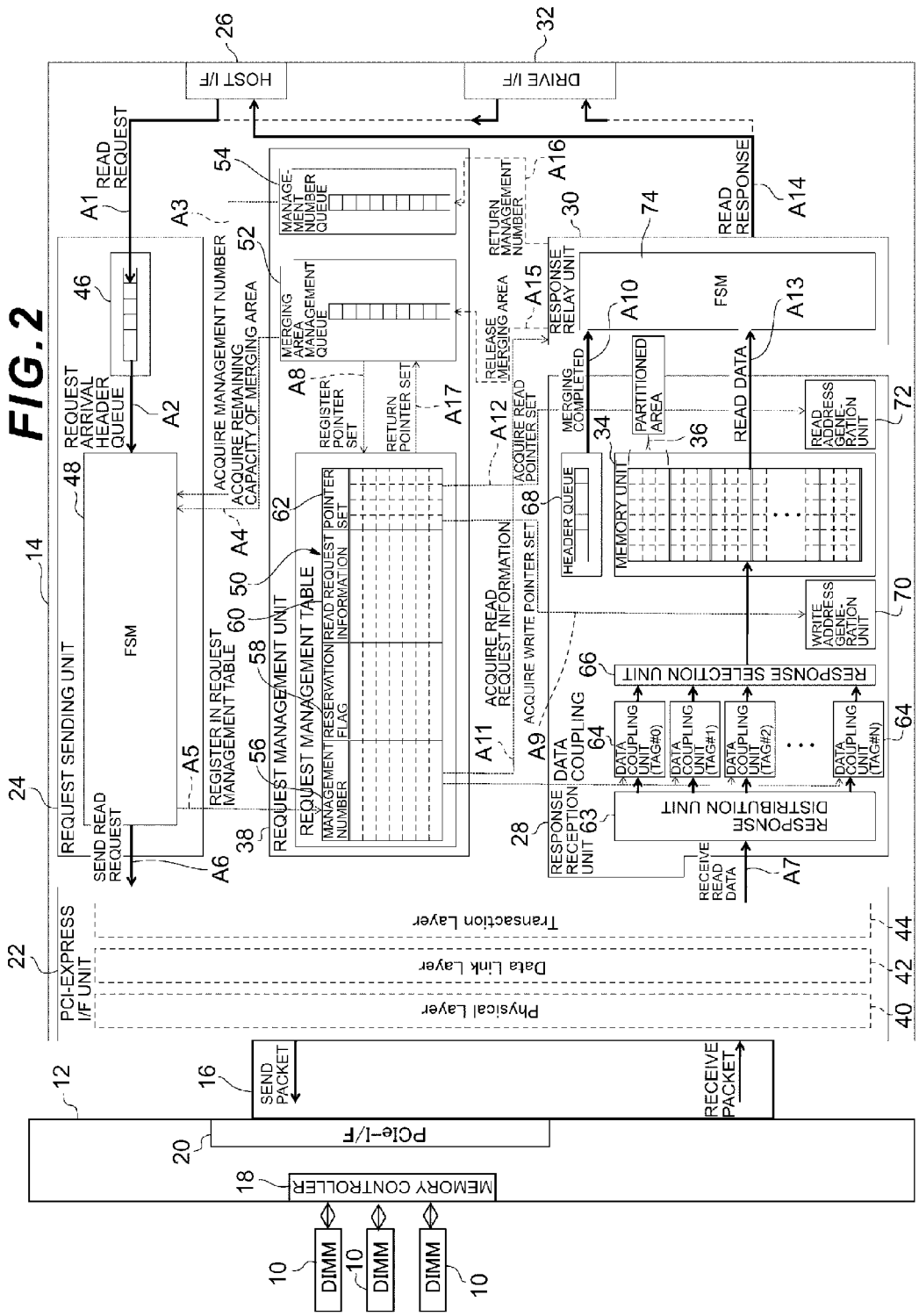
FIG. 2 is a block structure diagram showing the entire of a storage apparatus.

FIG. 2 is a block diagram showing an embodiment of the present invention. In FIG. 1, the storage apparatus is consisted of the plurality of memories 10, the memory control unit 12, and the relay unit 14. Each of the memories 10 and the memory control unit 12 are connected via the data bus, and the memory control unit 12 and the relay unit 14 are connected via the data transmission path 16.

Each of the memories 10 is configured as a cache memory which temporarily stores data. The memory control unit 12 is configured of a microprocessor unit comprising the memory controller 18 and the high-speed interface 20. The high-speed interface 20 is PCI-Express for example, and is connected to the data transmission path 16.

The relay unit 14 is consisted of the high-speed interface 22, the request sending unit 24, the host interface 26, the response receiver unit 28, the response relay unit 30, the drive interface 32, and the request management unit 38, and the buffer 34 is allocated in the response receiver unit 28.

The high-speed interface 22 comprises a physical layer 40, a data link layer 42, and a transaction layer 44, is PCI-Express for example, and is connected to the data transmission path 16. The host interface 26 is connected to the host computer (not shown in the figure) via the network (not shown in the figure), and the drive interface 32 is connected to the storage device (not shown in the figure) via the internal network (not shown in the figure).

The request sending unit 24 is consisted of a request arrival header queue 46 and a finite status machine (FSM) 48 which performs the processing for sending read requests.

The request management unit 38 is consisted of a request management table 50, a merging area management queue 52, and a management number queue 54. The request management table 50 is configured as a table for storing the information related to a management number 56, a reservation flag 58, read request information 60, and a pointer set 62.

The response receiver unit 28 is consisted of a response distribution unit 63, data coupling units 64 from #0 to #N, a response selection unit 66, a header queue 68, and a buffer (hereinafter also referred to as a memory unit) 34, a write address generation unit 70, and a read address generation unit 72.

The response relay unit 30 is consisted of a finite status machine 74 which performs the processing for relaying data. It should be noted that the finite status machines 48 and 74 may be configured of an operational processing circuit comprising a micro-processor, for example.

In the request sending unit 14, if the finite status machine 48 receives a read request from the host interface 26 or the drive interface 32 (A1), the finite status machine 48 takes in the read request from the request arrival header queue 46 (A2), acquires a management number from the management number queue 54 for managing the received read request by a number specific to the read request, and exchanges the acquired management number with the original management number provided to the received read request (A3).

Next, the finite status machine 48 acquires the remaining capacity of the merging area from the merging area management queue 52 for confirming whether a free partitioned area (released partitioned area) 36 exists or not as a partitioned area 36 in the buffer 34 (A4). Subsequently, the finite machine 48 transmits the information related to the received read request to the request management unit 38 (A5), and registers the information related to the received read request in the read request management table 50.

Here, the finite status machine 48 determines the remaining capacity of the merging area acquired from the merging area management queue 52 and sends the received read request to the high-speed interface 22 on condition that the partitioned area 36 for storing the data requested in the read request is allocated in the buffer 34 (A6).

In this case, the request sending unit 24 adds the read request to the packet and sends the same to the memory control unit 12 via the high-speed interface 22 and the data transmission path 16.

Upon receiving a read request added to the packet, the memory control unit 12 accesses the memory 10 in accordance with the read request, reads the data requested in the read request from the memory 10, splits the read data into a plurality of units of data, adds a management number provided to the read request to each of the split data (hereinafter also referred to as a response data), adds each of the data to which the management numbers are added to the packet, and transmits the same to the high-speed interface 22 via the data transmission path 16.

Each time a packet is received, the high-speed interface 22 transfers the data (response data) added to the packet to the response receiver unit 28.

Upon receiving data (response data) from the high-speed interface 22 sequentially (A7), the response distribution unit 62 in the response receiver unit 28 determines the management number added to each of the received data (response data), and distributes each of the received data (response data) to the data coupling units 64 in accordance with the management number added to each of the received data (response data).

For example, the response distribution unit 62 distributes the data (response data) to which the management number 0 is added to the #0 data coupling unit 64 and distributes the data (response data) to which the management number 1 is added to the #1 data coupling unit 64.

The response selection unit 66 selects the data (response data) distributed to each of the data coupling units 64 per read request in accordance with the management number, and performs the processing for storing the selected data (response data) separately in the respective partitioned areas 36 in the buffer 34 per read request.

Here, the request management unit 38 performs the processing for taking in the partitioned area number of the allocated partitioned area 36 from the merging area management queue 52 and registering the same to the pointer set 62 in the request management table 50 (A8). Meanwhile, the write address generation unit 70 acquires the information related to the pointer set 62 from the request management table 50, and performs the processing for generating an address (write address) for storing the data in the partitioned area 36 in the buffer 34 in accordance with the acquired information (A9).

If all of the data requested in the respective read requests is stored in the allocated partitioned areas 36, it is considered that the merging is completed and a signal showing that the merging is completed is transmitted from the header queue 68 to the response relay unit 30 (A10).

Upon receiving the signal that the merging is completed from the header queue 68, the finite status machine 74 in the response relay unit 30 acquires the read request information 60 from the request management table 50 (A11), and starts the processing for receiving the read data from the response receiver unit 28. Here, the read address generation unit 72 in the response receiver unit 28 acquires the pointer set 62 from the request management table 50 (A12), and performs the processing for generating an address (read address) of each of the partitioned areas 36 for which the merging is completed in accordance with the acquired pointer set 62.

The response relay unit 30 sequentially reads the data of the same management number per read request from the respective partitioned areas 36 in the buffer 34 in accordance with the generated address (read address) generated in the read address generation unit 72 (A13). Subsequently, the response relay unit 30 compiles the data read from the respective partitioned areas 36 in the buffer 34 into one [data] per read request, and transmits the same as the read data (hereinafter also referred to as a read response data) to the access request source (A14).

For example, if the access request source is a host computer, the response relay unit 30 transmits the read data to the host computer via the host interface 26 or, if the access request source is a storage device, transmits the read data to the storage device via the drive interface 32.

Subsequently, the response relay unit 30 performs the processing for releasing the partitioned areas 36 from which the data was read among the partitioned areas 36 in the buffer 34, also instructs the merging area management queue 52 to release the merging area (A15), and performs the processing for returning the management numbers used for managing the respective read requests to the management number queue 54. (A16)

Here, the request management unit 38 performs the processing for returning the pointer set 62 corresponding to the management numbers used for managing the respective read requests to the merging area management queue 52 (A17).

Figure 3:
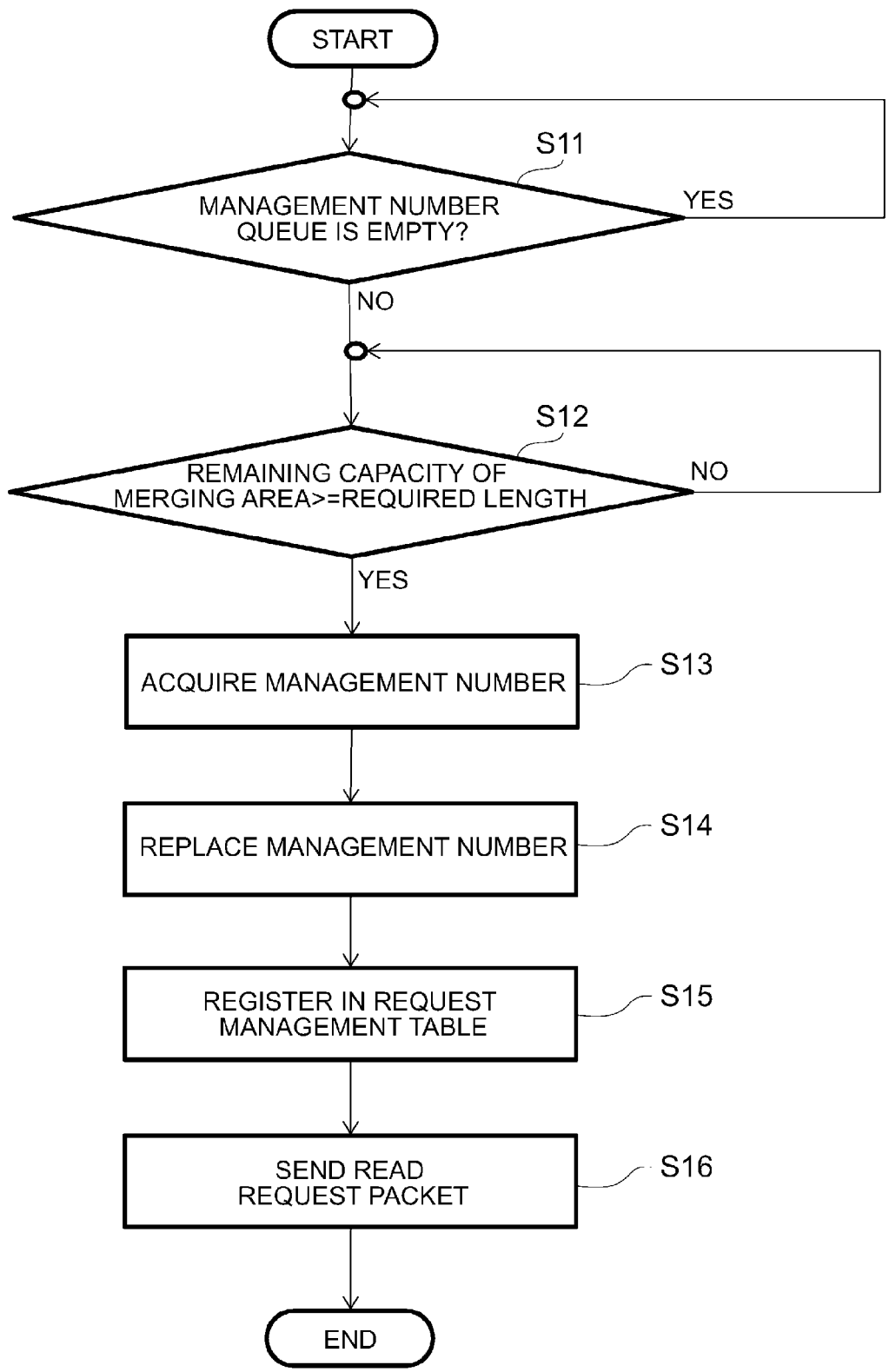
FIG. 3 is a flowchart explaining the processing in a request sending unit.

Next, the processing contents in the request sending unit are explained with reference to the flowchart in FIG. 3. This processing is started by the request sending unit receiving a read request from the access request source.

Upon receiving the read request, the request sending unit 24 determines whether the management number queue 54 is empty or not (S11) and, if the management number queue 54 is empty, repeats this processing.

Meanwhile, upon determining that the management number queue 54 is not empty, the request sending unit 24 determines whether the remaining capacity of the merging area is equal to or larger than the required length or not, repeats this processing if the remaining capacity of the merging area is below the required length and, upon determining that the remaining capacity of the merging area is equal to or larger than the required length, that is, upon determining in accordance with the information from the merging area management queue 52 that one or more partitioned areas 36 for storing the data of the required length by the read request in the buffer 34 exist, acquires the management number from the management number queue 54 (S13).

Next, as management number replacement processing, the request sending unit 24 performs the processing for converting the original tag number added to the read request (the number TAG# managed by the host computer or the storage device) into a management number specific to the relay unit 14 (S14). Specifically speaking, the request sending unit 24 converts the original tag number added to the read request into the number acquired from the management number queue 54.

Next, the request sending unit 24 performs the processing for registering the read request information added to the read request (the information transmitted from the host computer or the storage device) in the management table 50, and also performs the processing for securing or reserving the partitioned areas 36 in the buffer 34 with the sufficient capacity for storing the data requested in the read request (S15).

Next, on condition that two or more partitioned areas 36 are allocated in the buffer 34 as the partitioned areas 36 with the sufficient capacity for storing the data requested in the read request, the request sending unit 24 adds the read request to the packet, sends the same as a read request packet to the memory control unit 12 via the high-speed interface 22 (S16), and terminates the processing of this routine.

Figure 4:
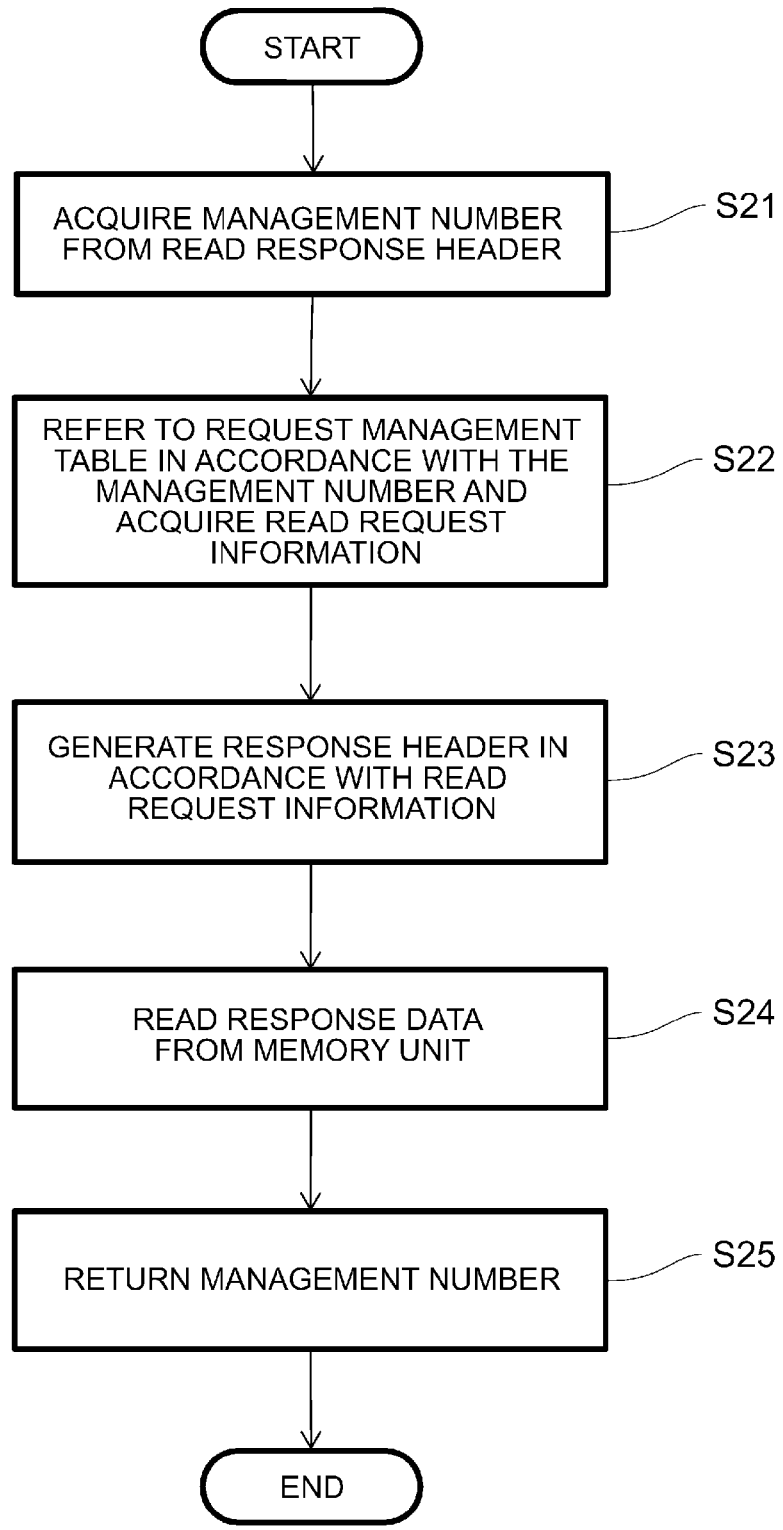
FIG. 4 is a flowchart explaining the processing in a response relay unit.

Next, the processing contents of the response relay unit 30 are explained with reference to the flowchart in FIG. 4. This processing is started by the response relay unit 30 receiving the merging completion from the response receiver unit 28.

Upon receiving the merging completion, the response relay unit 30 acquires the management number 56 added to the read response header in accordance with the read response header (S21), refers to the request management table 50 in the request management unit 38 in accordance with the acquired management number 56, acquires the read request information 60 corresponding to the management number 56 (S22), creates the response header in accordance with the acquired read request information 60, and also performs the processing for converting the management number 56 specific to the relay unit 14 into an original tag number (S23).

Next, the response relay unit 30 reads the response data from the buffer (memory unit) 34, that is, [reads] the data for which the merging is completed from the partitioned areas 36 (S24), compiles the read response data into one read data, and transmits the same to the access request source (S24).

Next, after transmitting the read data to the access request source, the response relay unit 30 performs the processing for releasing the partitioned area 36 in which the transmitted read data was stored, also returns the management number 56 to the management number queue 54, instructs the merging area management queue 52 to release the partitioned area 36 (S25), and terminates the processing of this routine.

Figure 5:
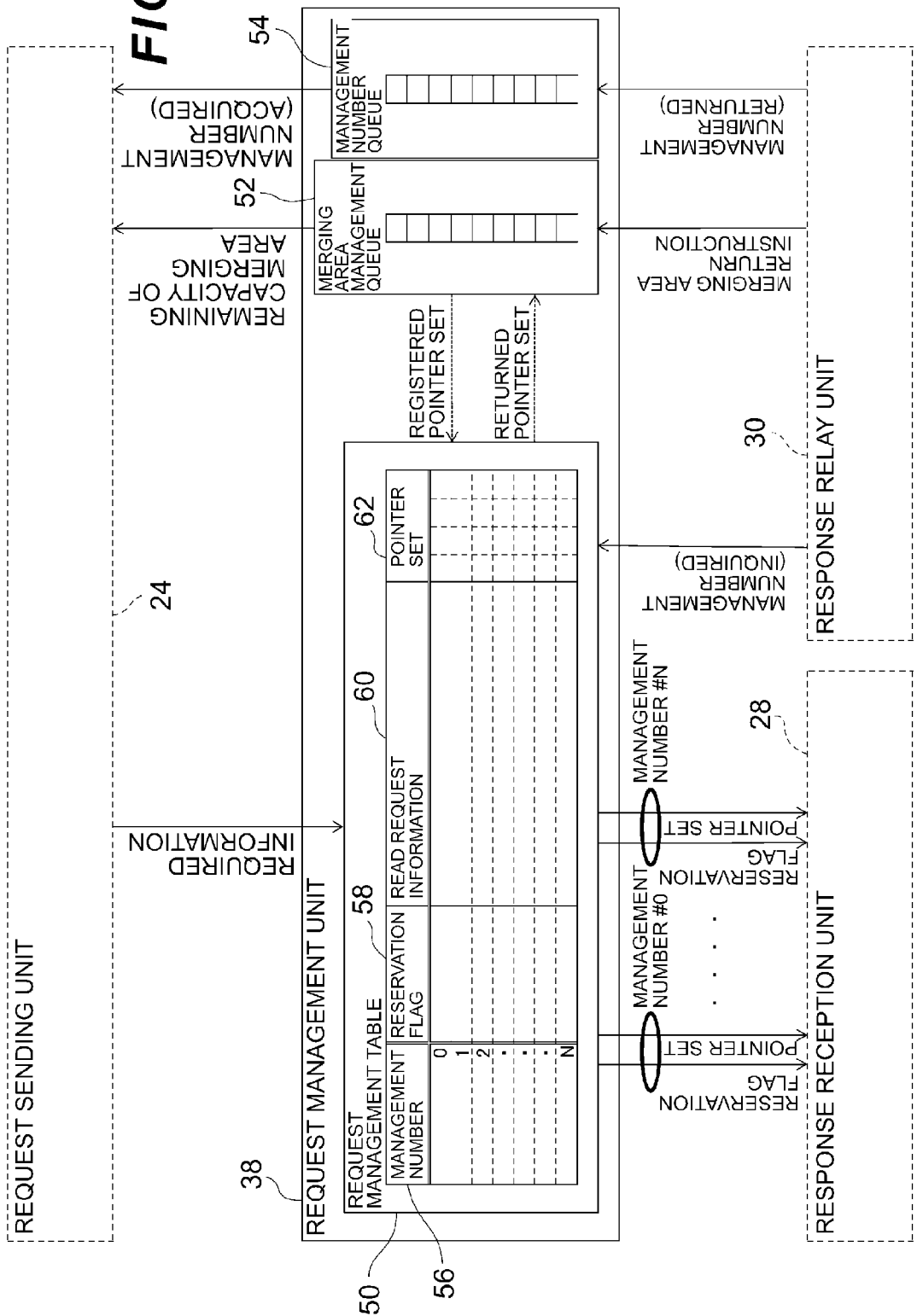
FIG. 5 is a block diagram explaining the relationship between a request management unit and the request sending unit and the relationship between the request management unit and a response reception unit.

Next, the block diagram explaining the relationship between the request management unit and the request sending unit and the relationship between the request management unit and the response receiver unit is shown in FIG. 5. Furthermore, FIG. 6 shows the diagram of the management number queue at the time of initialization, FIG. 7 shows the diagram of the management number queue at the time of acquiring management numbers, and FIG. 8 shows the diagram of the management number queue at the time of returning a management number.

Figure 6:
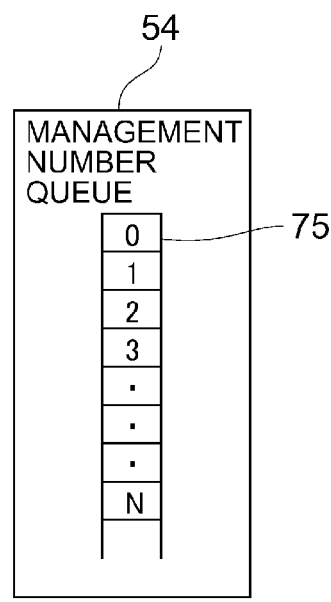
FIG. 6 is a diagram of a management number queue at the time of initialization.

In FIG. 5, the management number queue 54 is a queue which manages the management numbers (TAG#'s) specific to the relay unit 14 provided to the respective read requests, and the management numbers (positive integers) from 0 to N are stored in the respective queue factors 75 at the time of initialization as shown in FIG. 6.

Here, upon receiving a read request, the request sending unit 24 extracts the management number of the respective queue factors 75 in the management number queue 54 each time a read request is received, and adds the extracted management number to the read request.

Figure 7:
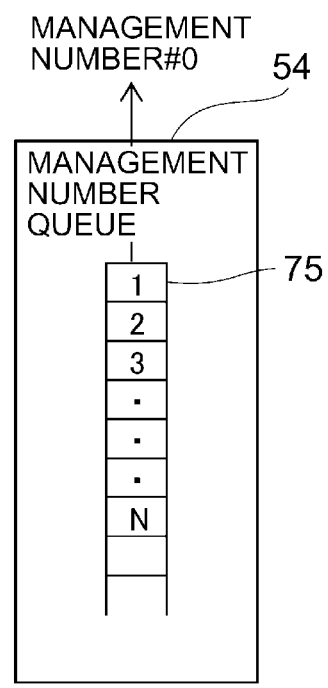
FIG. 7 is a diagram of the management number queue at the time of getting management numbers.
Figure 8:
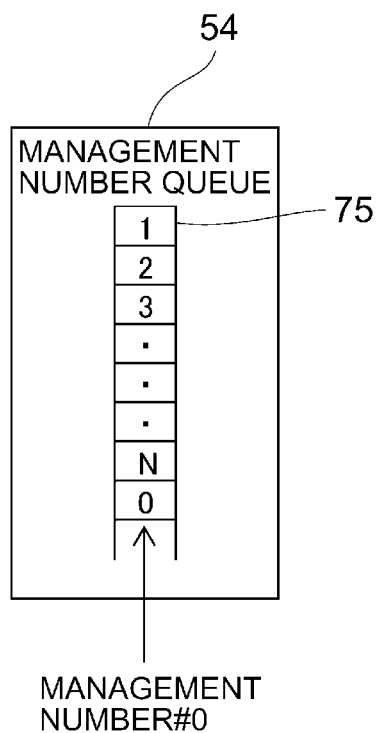
FIG. 8 is a diagram of the management number queue at the time of returning a management number.

For example, upon receiving a read request #0, as shown in FIG. 7, the request sending unit 24 extracts the management number #0 from the management number queue 54, and adds the management number #0 to the read request #0.

If the management number acquired from the management number queue 54 is added to the read request, the information for managing the read request is stored in the request management table 50.

For example, if the management number added to the read request #0 is #0, the information "0" is stored in the entry of the management number 56 as the management number for managing the read request #0. Similarly, if the management numbers added to the read requests #1, . . . #N are #1, . . . #N, the information from "1" to "N" is stored as the management numbers for managing the read requests #1, . . . #N in the entries of the management number 56.

Furthermore, if the partitioned area 36 is allocated or reserved, "1" is stored as the information indicating that the partitioned area 36 is allocated or reserved in the entry of the reservation flag 58. It should be noted that the information "0" is stored in the entry of the reservation flag 58 if the partitioned area 36 is already released.

In the entry of the read request information 60, the read request information (the information transmitted from the host computer or the storage device) added to each of the read requests is stored. Furthermore, in the entry of the pointer set 62, the number acquired from the merging area management queue 52 is registered.

The merging area management queue 52 is the queue for managing the numbers of the allocated partitioned areas 36 if the partitioned areas 36 for storing the data requested in the read request are allocated or reserved. For example, if the numbers of the allocated partitioned areas 36 are "4", "2", "0", and "5", the number "4205" is stored as the information related to the pointer set 62 in the entry of the pointer set 62 of the request management table 50.

The information stored in the entry of the reservation flag 58 and the information stored in the entry of the read request information 60 is transferred to the response receiver unit 28 per management number 56.

Meanwhile, if the processing of returning the management number is performed from the response relay unit 30 to the request management unit 38, the returned management number is added to the last queue element 75. For example, if the management number of the last queue element 75 is "N" and the returned management number is "0" as shown in FIG. 8, the management number "0" is added after the management number N.

However, it is the condition for the management number to be returned that the partitioned areas 36 in the buffer 34 are released. Therefore, the management number may be returned in random order in accordance with the order of the data transmitted from the memory control unit 12 to the relay unit 14 regardless of the order of read requests sent from the request sending unit 24 to the memory control unit 12.

Figure 9:
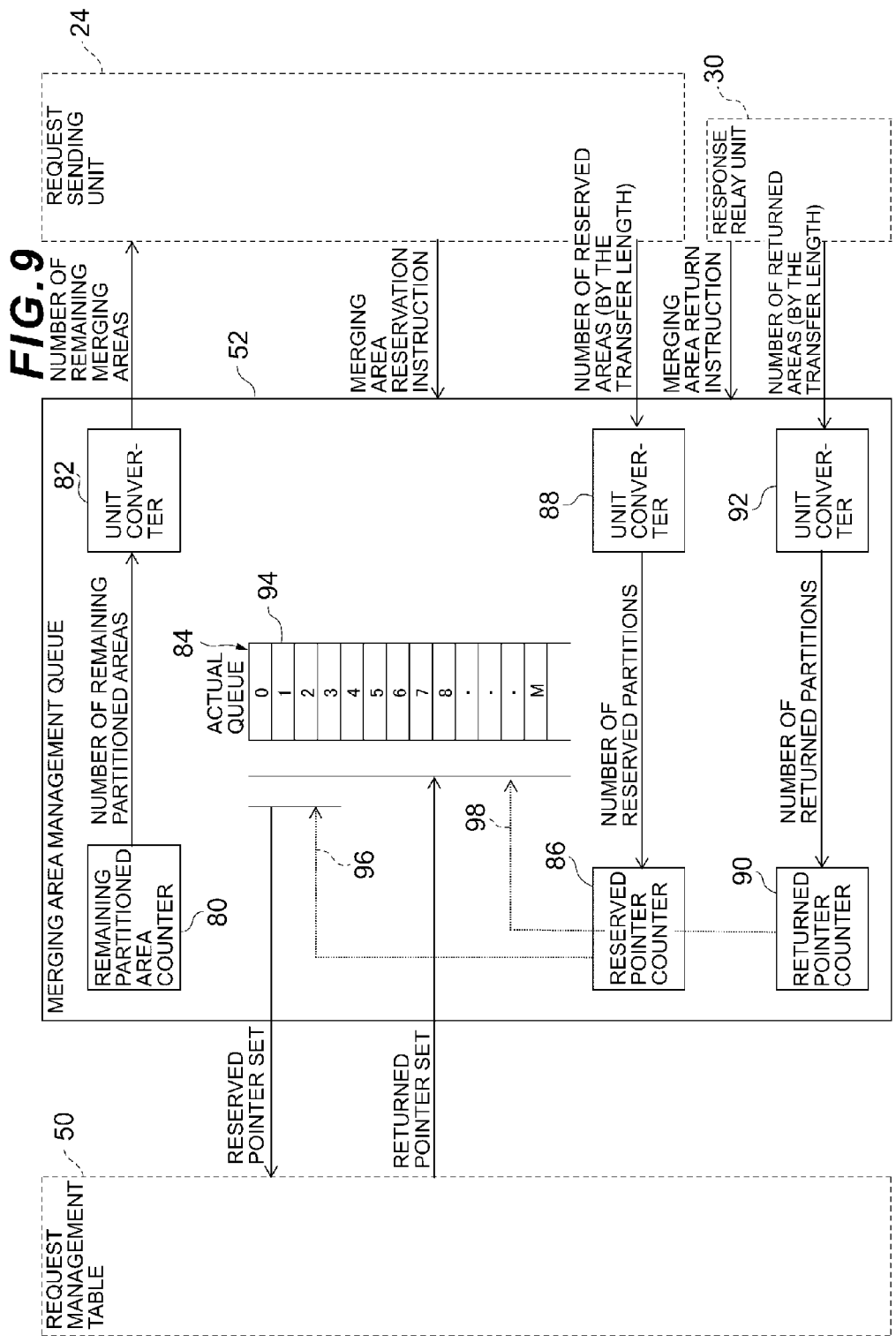
FIG. 9 is a block diagram explaining the relationship between a request management table and a merging area management queue and the relationship between the merging area management queue and the request sending unit.

Next, the block diagram explaining the relationship between the merging area management queue and the request management table and the relationship between the merging area management queue and the request sending unit is shown in FIG. 9.

In FIG. 9, the merging area management queue 52 is configured of a remaining partitioned area counter 80, a unit converter 82, an actual queue 84, a reserved pointer counter 86, a unit converter 88, a returned pointer counter 90, and a unit converter 92.

The actual queue 84 is configured as a number storage memory which stores partitioned area numbers corresponding to the released partitioned areas 36 among the partitioned area numbers respectively identifying a plurality of partitioned areas 36. In this actual queue 84, for example, the numbers 0, 1, 2, . . . N are stored as the partitioned area numbers indicating the numbers of the released partitioned areas 36 among the partitioned areas 36 in the buffer 34.

If a merging area reservation instruction for securing or reserving partitioned areas 36 is input from the request sending unit 24 and if the number of reserved areas (by the transfer length) is specified by the unit indicating the length of the data requested in the read request, for example, in units of bytes or in units of doublewords (DW), the unit converter 88 converts the number of reserved areas into the number of reserved partitions, and outputs the same to the reserved pointer counter 86.

When the request sending unit 24 performs the processing for securing or reserving partitioned areas 36 in the buffer 34, the reserved pointer counter 86 counts the location of the reserved pointer 96 for reading the queue elements 94 in the actual queue 84. From the queue element 94 on the location indicated by the reserved pointer 96, the number of the queue elements 94 for the reserved partitioned areas is the number of the pointer set 62 which is allocated or reserved. Here, the count value for the size (the number of numbers) specified by the reserved partitioned areas is supposed to be added to the reserved pointer counter 86 when the partitioned areas 36 are reserved.

Here, for example, if the length of the data requested in the read request is 1 kB and one partitioned area 36 is configured by 256 B (bytes), four partitioned areas 36 are necessary, and therefore a signal indicating the number of reserved partitions=4 is output to the reserved pointer counter 86 from the unit converter 88. In this case, the reserved pointer counter 86 counts "4" as the number of reserved partitions. Therefore, from the actual queue 84, four partitioned area numbers of the released partitioned areas 36 are stored as the numbers used for the pointer set 62 in the entry of the pointer set 62 of the request management table 50.

If a merging area return instruction for releasing the partitioned areas 36 is input from the response relay unit 30 and, at the same time, if the number of returned areas (by the transfer length) is input, the unit converter 92 converts the number of returned areas into the number of returned partitions, and outputs the signal indicating the converted number of returned partitions to the returned pointer counter 90.

When the response relay unit 30 releases the plurality of partitioned areas 36 and returns the plurality of numbers stored in the pointer set 62 from the request management table 50 to the merging area management queue 52, the returned pointer counter 90 counts the location where the returned pointer 98 writes the queue elements 94. Here, from the queue element 94 on the location indicated by the returned pointer 98, the returned pointer set for the number of returned partitions is written. Specifically speaking, the plurality of numbers to be returned are respectively registered in the queue elements 94. Here, the count value for the size specified by the number of returned partitions (the number of returned numbers) is supposed to be added to the returned pointer counter 90.

Here, for example, if the transfer length is 1 kB and one partitioned area is configured by 256 B, the number of returned areas is equivalent to four partitioned areas 36, and therefore a signal indicating the number of returned partitions=4 is output from the unit converter 92 to the returned pointer counter 90.

In this case, four numbers stored in the pointer set 62 of the request management table 50 are supposed to be returned as the returned pointer set to the actual queue 84, and the returned pointer counter 90 counts the number of returned partitions=4. Therefore, four partition numbers corresponding to the released partitioned areas 36 are supposed to be added to the actual queue 84.

The remaining partitioned area counter 80 ascertains the number of the released partitioned area numbers existing in the actual queue 84, that is, the number of queue elements 94 existing in the actual queue 84, and outputs this ascertained value as a signal indicating the remaining partitions to the unit converter 82. The unit converter 82 converts the number of remaining partitions into the number of remaining merging areas, and outputs the number of remaining merging areas to the request sending unit 24.

For example, if one merging area (a storage area managed in the virtual memory which is explained later) is managed corresponding to four partitioned areas 36, the number of remaining partitions=4 is equivalent to one merging area, and therefore a signal indicating that the number of remaining merging areas (the number of remaining merging areas)=1 is output.

Here, the reserved pointer counter 86 can be configured as a reserved [pointer] counter for ascertaining the number of partitioned areas necessary for storing the data of the length requested in the read request received in the request sending unit 24. Furthermore, the remaining partitioned area counter 80 can be configured as a release counter for determining the partitioned area numbers stored in the actual queue 84 and ascertaining the number of released partitioned areas among a plurality of partitioned areas 36, and can also be configured as a remaining partitioned area counter which ascertains the number of remaining partitioned areas by the difference between the ascertained value of the reserved [pointer] counter and the ascertained value of the released [pointer] counter.

In this case, if the ascertained value of the remaining partitioned area counter is positive, the request sending unit 24 can select one or more partitioned areas of the number corresponding to the ascertained value of the reserved [pointer] counter from the plurality of partitioned areas 36 and secure the same.

Furthermore, the reserved pointer counter 86 can be configured as a reserved [pointer] counter for ascertaining the number of partitioned areas necessary for storing the data of the length requested in the read request received in the request sending unit 24 and selecting the plurality of partitioned area numbers corresponding to the ascertained value as the reserved partitioned area numbers from the actual queue (number storage memory) 84.

In this case, the request sending unit 24 can manage the plurality of partitioned areas 36 corresponding to the plurality of partitioned area numbers selected by the reserved [pointer] counter as one or more allocated partitioned areas 36.

Furthermore, on condition that all of the allocated partitioned areas 36 are released, the returned pointer counter 90 can be configured as a return counter for ascertaining the number of the respective released partitioned areas 36 and registering the partitioned area numbers of the respective released partitioned areas 36 as the returned partitioned area numbers in the actual queue (number storage memory) 84.

Figure 10:
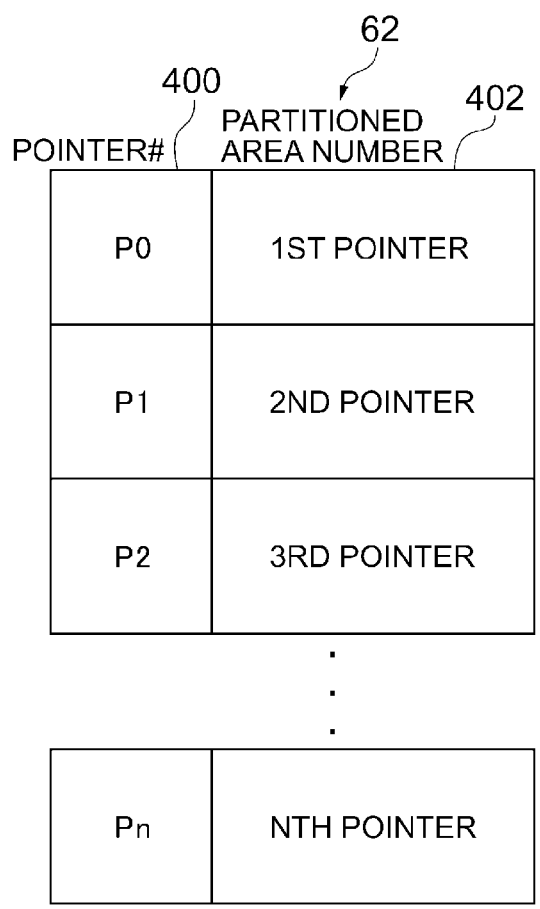
FIG. 10 is a diagram of a pointer set.

Next, the diagram of the pointer set is shown in FIG. 10. In FIG. 10, the pointer set 62 indicates a set of partitioned area numbers (pointers) in the partitioned areas 36 and is configured of a pointer number 400 and a partitioned area number 402. As the pointer numbers 400, for example, P0, P1, . . . Pn are used. As the partitioned area numbers 402, numbers indicating a first pointer, a second pointer, and a third pointer, . . . an N-th pointer, for example, 0, 1, 2, 3, . . . N are used.

Figure 11:
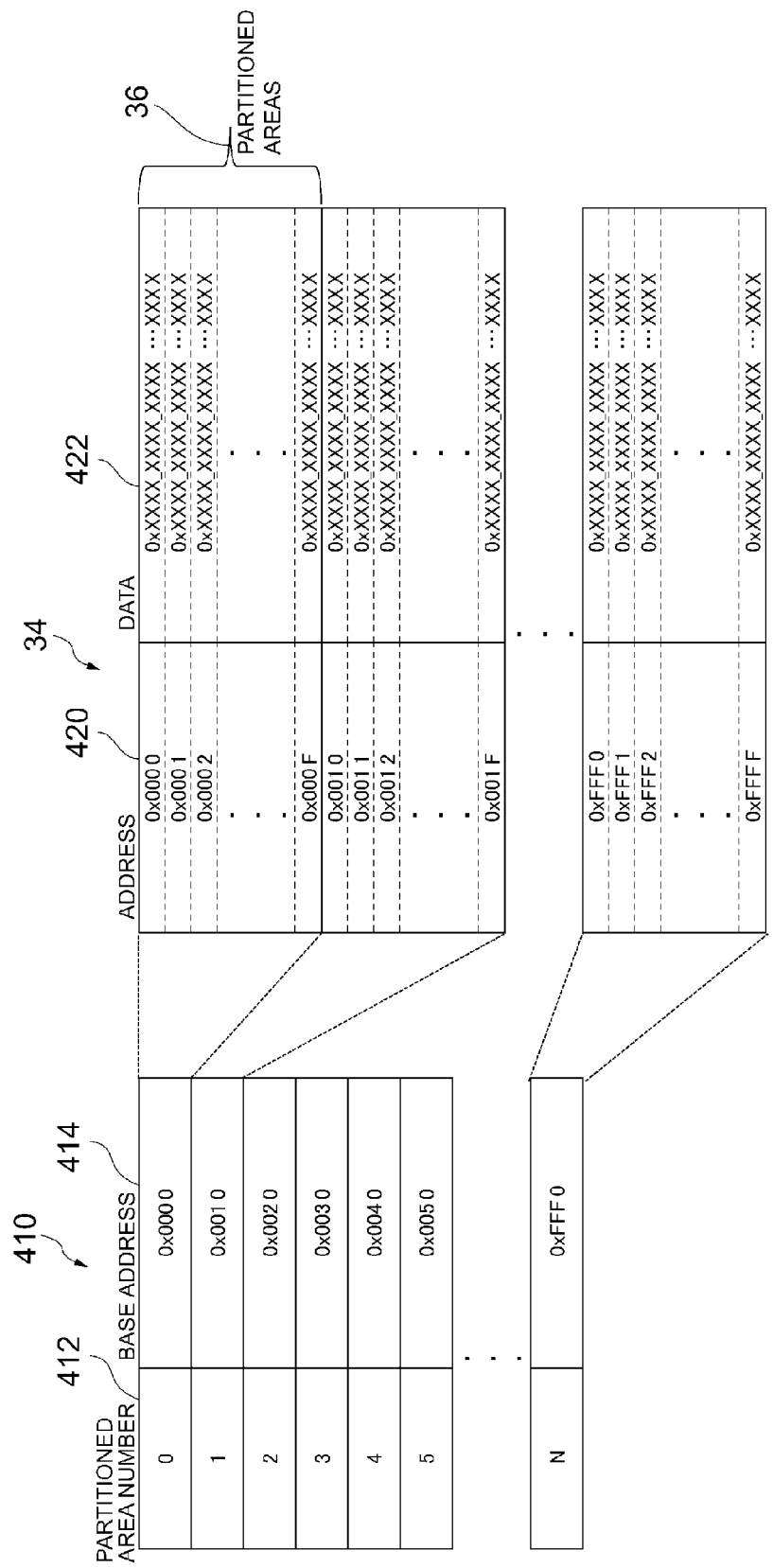
FIG. 11 is a diagram explaining the relationship between a base address map and a physical memory.

Next, the diagram showing the relationship between the base address map and the physical memory is shown in FIG. 11.

In FIG. 11, the base address map 410 is configured of a partitioned area number 412 and a base address 414. As the partitioned area numbers 412, the numbers used for the partitioned area numbers 402 of the pointer set 62, for example, 0, 1, . . . N are used.

The base address 414 is configured as an address for managing a base address or a head address of a partitioned area 36. For example, "0x0000" is used as the base address 414 corresponding to the partitioned area number #0, and "0x0010" is used as the base address 414 corresponding to the partitioned area number #1.

The base address 414 is made to correspond to the address (physical address) 420 of the buffer 34 configuring the physical memory. For example, the base address 414 corresponding to the partitioned area number 412 #0 is made to correspond to the addresses 420 from "0x0000" to "0x000F" in the buffer 34, and the base address 414 corresponding to the partitioned area number 412 #1 is made to correspond to the addresses 420 from "0x0010" to "0x001F" in the buffer 34. Corresponding to each of the addresses 420, data 422 is stored in the partitioned area 36 in the buffer 34. Here, if one partitioned area 36 is assumed to be 16 B*16, the data 422 of 256 B is stored in one partitioned area 36.

Figure 12:
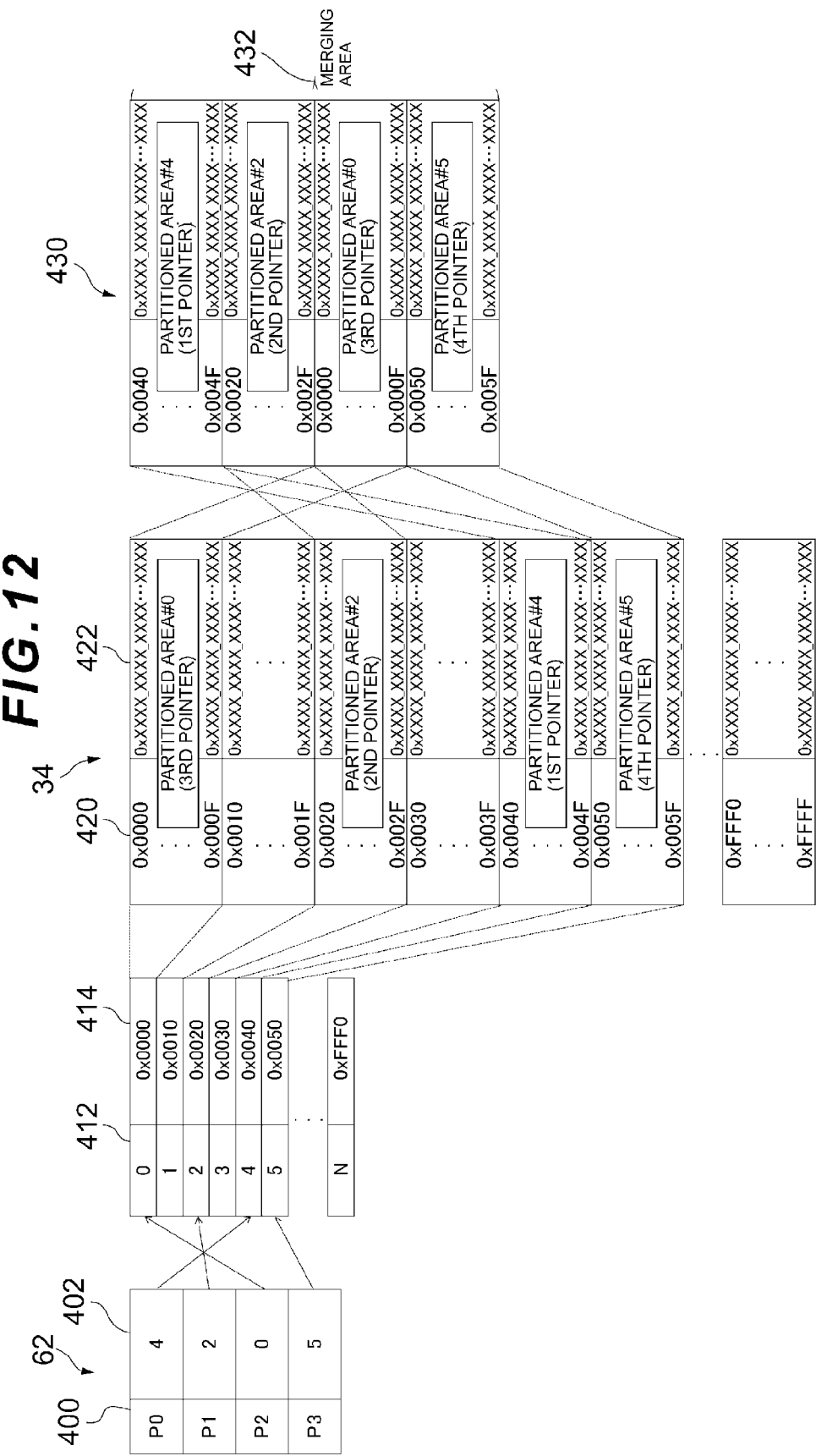
FIG. 12 is a diagram explaining the relationship between the pointer set, the base address, the physical memory, and the virtual memory.

Next, the diagram showing the relationship among the pointer set, the base address, the buffer (physical memory), and the virtual memory is shown in FIG. 12.

In FIG. 12, if four partitioned areas 36 are reserved assuming one partitioned area=16 B*16=256 B, the length requested in the read request=1 kB, a first pointer set in the pointer set 62=4, a second pointer set=2, a third pointer set=0, and a fourth pointer set=5, "4, 2, 0, 5" are stored as the partitioned area numbers indicating the allocated or reserved partitioned areas 36 in the partitioned area numbers 402 corresponding to the pointer numbers P0, P1, P2, and P3. Specifically speaking, the number "4205" is registered from the merging area management queue 59 to the pointer set 62 in the request management table 50.

The partitioned area number 402 of the pointer set 62 is made to correspond to the partitioned area number 412 in the base address map 410.

For example, the base address 414 corresponding to the partitioned area number 412 #0 is "0x0000", and the base address 414 corresponding to the partitioned area number 412 #2 is "0x0020". Furthermore, the base address 414 corresponding to the partitioned area number 412 #4 is "0x0040", and the base address 414 corresponding to the partitioned area number 412 #5 is "0x0050".

Meanwhile, the base address 414 is made to correspond to the address 420 in the buffer 34. For example, the base address 414 of "0x0000" is made to correspond to the addresses 420 in the buffer 34 from "0x0000" to "0x000F". The base address 414 of "0x0020" is made to correspond to the addresses 420 in the buffer 34 from "0x0020" to "0x002F".

Similarly, the base address 414 of "0x0040" is made to correspond to the addresses 420 in the buffer 34 from "0x0040" to "0x004F", and the base address 414 of "0x0050" is made to correspond to the addresses 420 in the buffer 34 from "0x0050" to "0x005F".

Furthermore, the addresses 420 in the buffer 34 are the addresses set for one merging area 432 structured in the virtual memory 430, and are made to correspond to sequential virtual addresses.

Specifically speaking, physical addresses ("0x0000" to "0x000F", "0x0020" to "0x002F", "0x0040" to "0x004F", "0x0050" to "0x005F") in all of the four partitioned areas 36 are made to correspond to sequential virtual addresses in one virtual merging area 432. Therefore, even if the physical addresses in the allocated partitioned areas 36 are non-sequential, the relay unit 14 can manage all of the allocated partitioned areas 36 virtually by the sequential addresses in one merging area 432.

Here, the response receiver unit 28 structures a plurality of merging areas 432 to be the virtual storage areas to which the sequential virtual addresses are assigned in the virtual memory 430, and manages the partitioned areas 36, for example, #4, #2, #0, and #5 in one merging area 432.

Furthermore, the response receiver unit 28 can manage a plurality of partitioned area numbers corresponding to the respective partitioned areas 36 and a plurality of physical addresses which are sequential in the respective partitioned areas by causing the same to correspond to each other, and also manage a plurality of physical addresses in all of the allocated partitioned areas which correspond to a plurality of partitioned area numbers selected by the reserved pointer counter 86 ("0x0000" to "0x000F", "0x0020" to "0x002F", "0x0040" to "0x004F", "0x0050" to "0x005F") by causing the same to correspond to a plurality of sequential virtual addresses in one virtual merging area 432.

Figure 13:
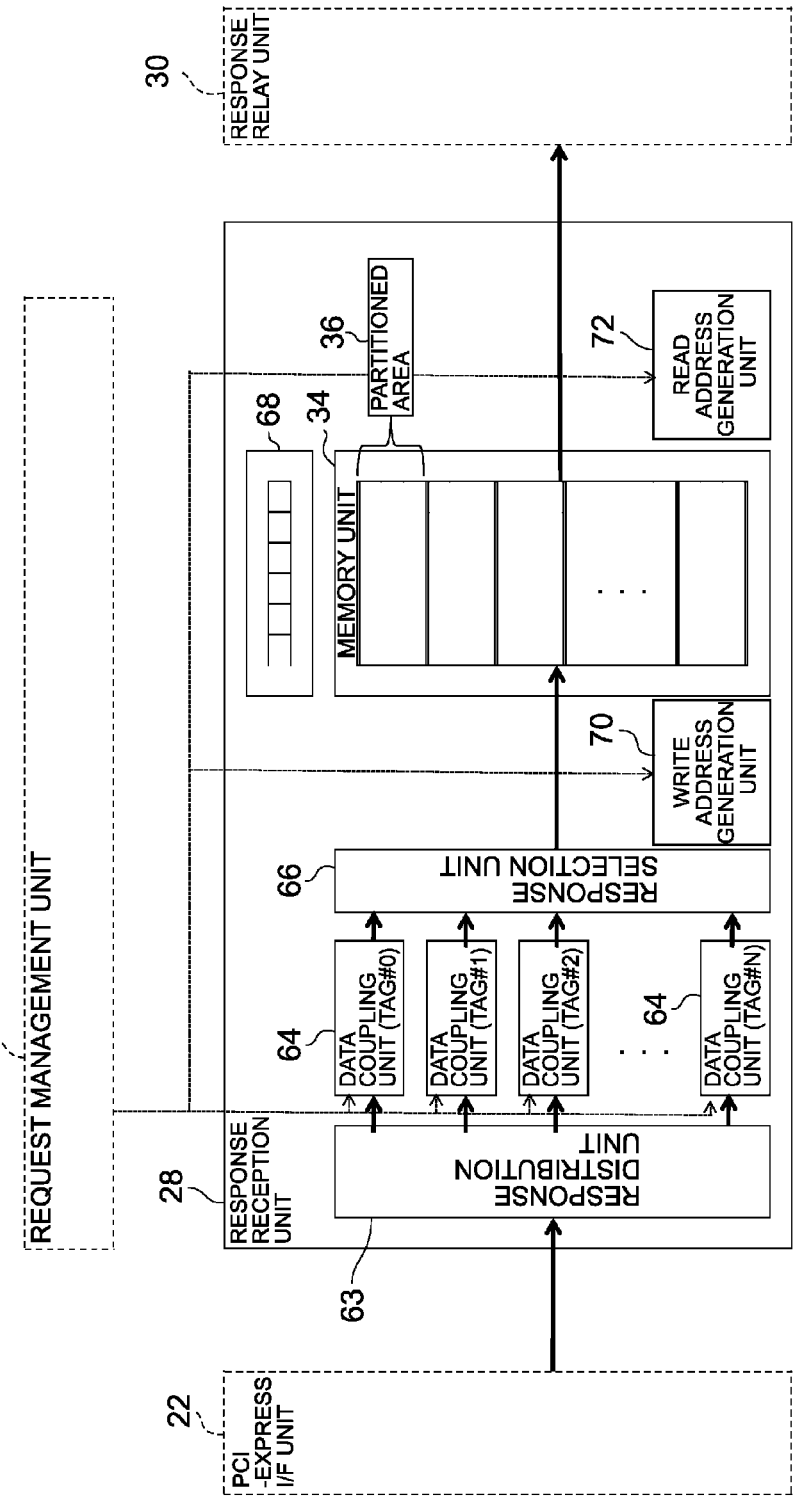
FIG. 13 is a block diagram in case where the response reception unit is configured of hardware.

Next, the block diagram in case where the response receiver unit is configured of hardware is shown in FIG. 13.

In FIG. 13, the response receiver unit 28 is configured of the response distribution unit 62, the plurality of data coupling units 64, the response selection unit 66, the header queue 68, the write address generation unit 70, the read address generation unit 72, and the buffer (memory unit) 34. The concrete configuration of each of the units is now explained.

Figure 14:
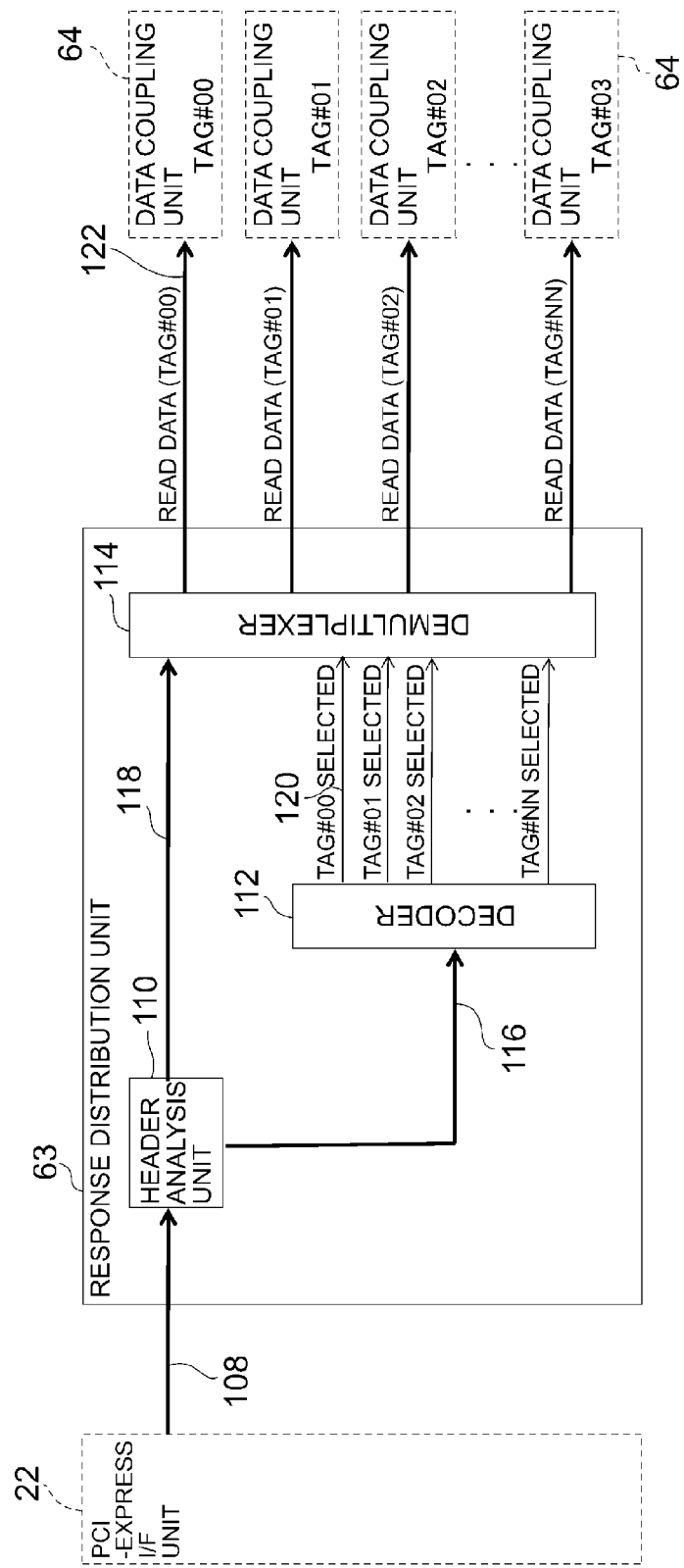
FIG. 14 is a block diagram of a response distribution unit.

FIG. 14 shows the block diagram of the response distribution unit 62.

In FIG. 14, the response distribution unit 62 is configured of a header analysis unit 110, a decoder 112, and a demultiplexer 114.

Upon receiving a completion packet 108 transferred from the high-speed interface 22, the header analysis unit 110 analyzes a header and a guarantee code added to the received completion packet 108, outputs the management number (TAG#) 116 included in the header to the decoder 112, and outputs the read data 118 added to the received completion packet 108 to the multiplexer 114.

The decoder 112 decodes the management number 116 and outputs a select signal 120 acquired by decoding to the demultiplexer 114. For example, if the management number 116 is configured of 3-bit digital signals (from "000" to "111"), the decoder 112 converts the digital signals from "000" to "111" into select signals 120 indicating TAG#00 to TAG#07. Here, if the management number 116 is a digital signal indicating "001", the decoder 112 outputs a select signal 120 indicating TAG#01 to the demultiplexer 114.

In response to the select signal 120 from the decoder 112, the demultiplexer 114 outputs the read data 118 from the header analysis unit 110 as the read data 122 to the data coupling unit 64. For example, if a select signal 120 TAG#01 is input, the demultiplexer 114 outputs the read data 122 of TAG#01 to the data coupling unit 64 of TAG#01.

Specifically speaking, upon receiving a completion packet 108 from the high-speed interface 22, the response distribution unit 62 analyzes the header and the data protection code added to the completion packet 108, also determines the management number 116 included in the header, and distributes the read data 122 to the data coupling units 64 allocated per management number in accordance with the management number 116.

Figure 15:
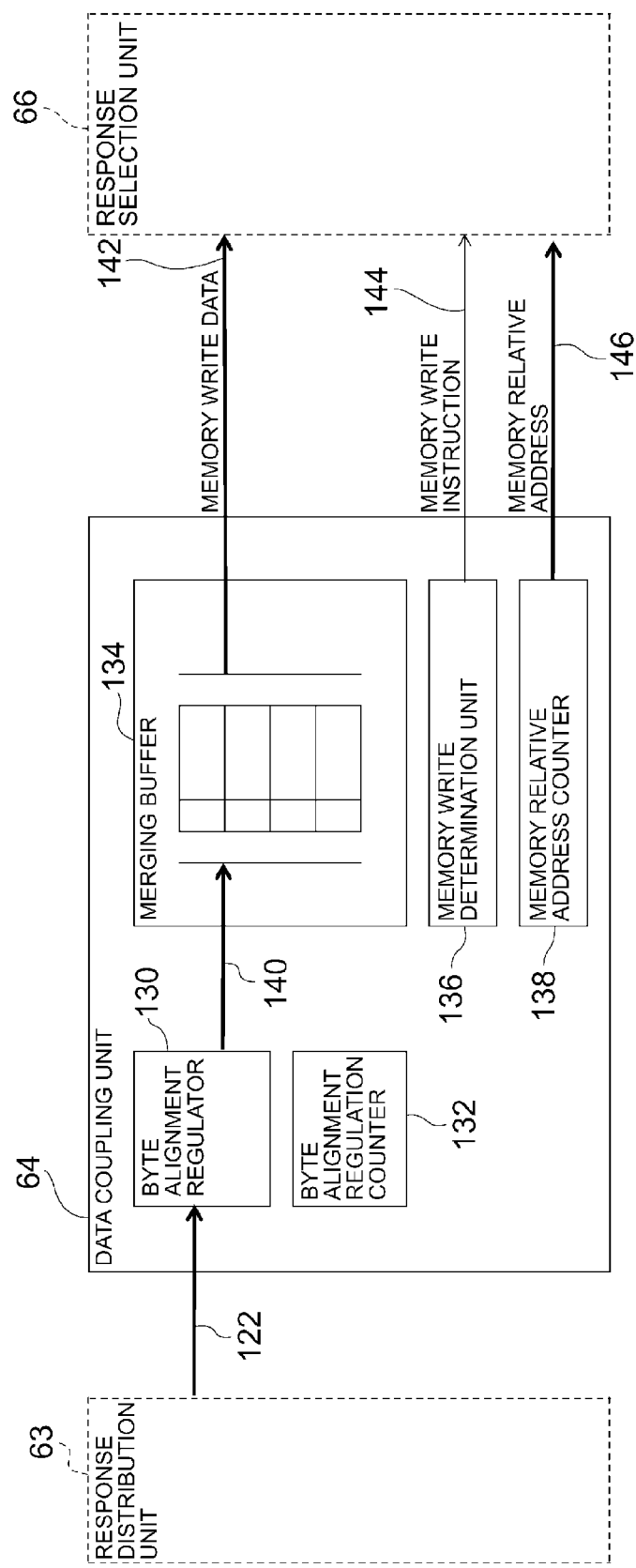
FIG. 15 is a block diagram of a data coupling unit.

Next, the block diagram of the data coupling unit is shown in FIG. 15.

In FIG. 15, each of the data coupling units 64 is configured of a byte alignment regulator 130, a byte alignment regulation counter 132, a merging buffer 134, a memory write determination unit 136, and a memory relative address counter 138.

Upon receiving read data 122 from the response distribution unit 62, the byte alignment regulator 130 performs the control for transferring the received read data 122 as read data 140 to the merging buffer 134, and outputs memory write data 142 to the response selection unit 66 on condition that the capacity of the read data 140 stored in the merging buffer 134 reaches a memory data width.

For example, if the memory data width is set to be 16 B and read data 140 of 4 B is sequentially stored in the merging buffer 134, on condition that all of 4 units of read data 140 are stored in the merging buffer 134, the read data 140 of 16 B is output as the memory write data 142 to the response selection unit 66.

The byte alignment regulation counter 132 counts the capacity of the read data 140 stored in the merging buffer 134 and outputs the count value to the memory write determination unit 136. The memory write determination unit 136 outputs a memory write instruction 144 to the response selection unit 66 if the count value of the byte alignment regulation counter 132 reaches a set value, for example, a set value equivalent to the memory data width.

The memory relative address counter 138 outputs a memory relative address 146 to the response selection unit 66. As the memory relative address 146, for example, if the physical addresses set for one partitioned area 36 are configured of sequential addresses from 0 to 8, the signals indicating the numbers from 0 to 8 where the numbers from 0 to 8 circulate are used.

Figure 16:
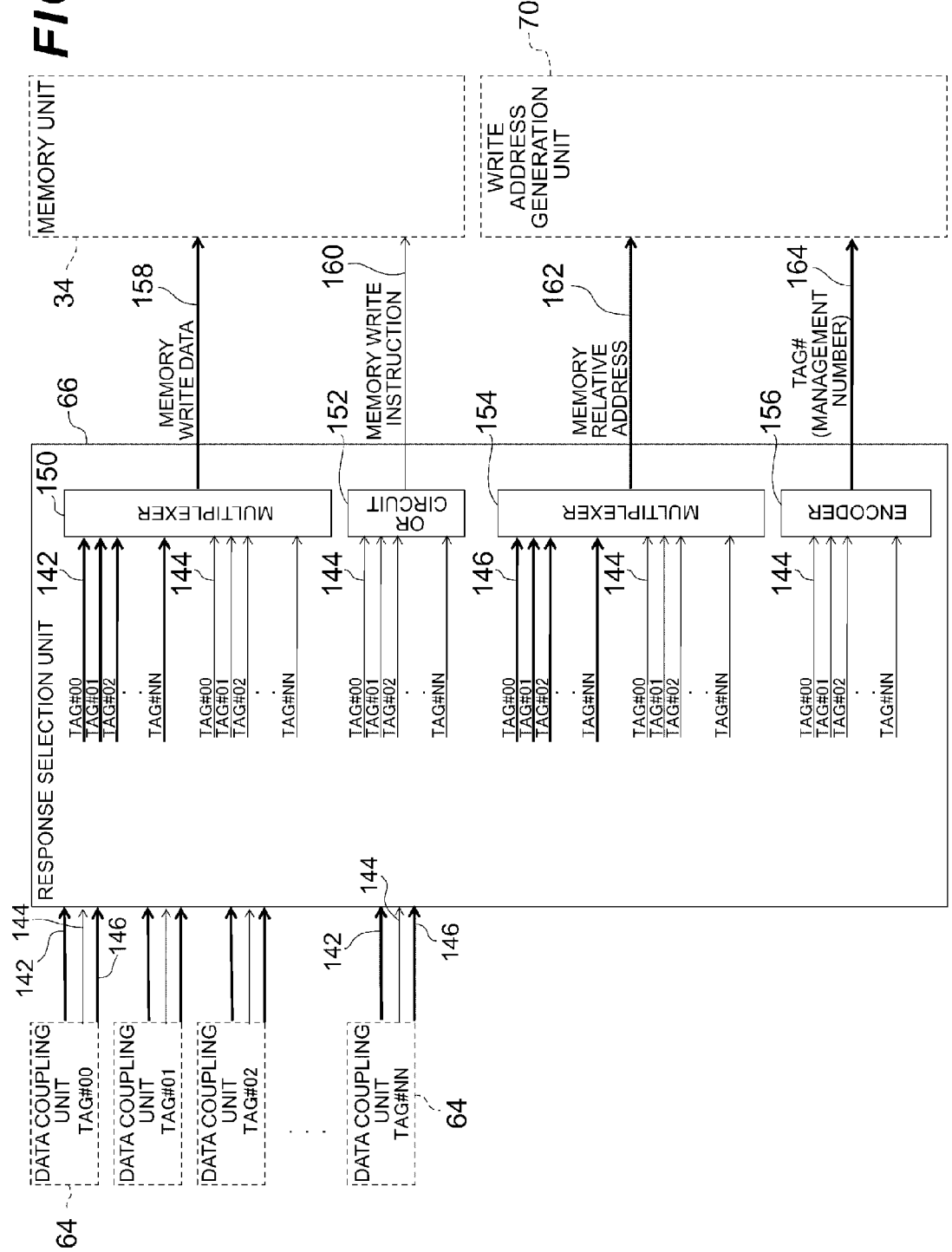
FIG. 16 is a block diagram of a response selection unit.

Next, the block diagram of the response selection unit 66 is shown in FIG. 16.

In FIG. 16, the response selection unit 66 is configured of a multiplexer 150, an OR circuit 152, a multiplexer 154, and an encoder 156.

The multiplexer 150 inputs memory write data 142 and memory write instructions 144 from the data coupling units 64 from TAG#00 to TAG#NN, and outputs the memory write data 142 instructed by the memory write instructions 144 as the memory write data 158 to the buffer (memory unit) 34.

The OR circuit 152 takes in the memory write instructions 144 from the data coupling units 64 from TAG#00 to TAG#NN and outputs the memory write instruction 160 to the buffer (memory unit) 34 in response to any of the memory write instructions 144.

The multiplexer 154 takes in the memory relative address 146 and the memory write instruction 144 from the data coupling units 64 from TAG#00 to TAG#NN, and outputs the memory relative address 146 instructed by any of the memory write instructions 144 as a memory relative address 162 to the write address generation unit 70.

The encoder 156 takes in the memory write instructions 144 from the data coupling units 64 from TAG#00 to TAG#NN, in response to any of the memory write instructions 144, converts the TAG# (management number) corresponding to the instructed memory write instruction 144 into a 3-bit management number 164 for example, and outputs the same to the write address generation unit 70.

Figure 17:
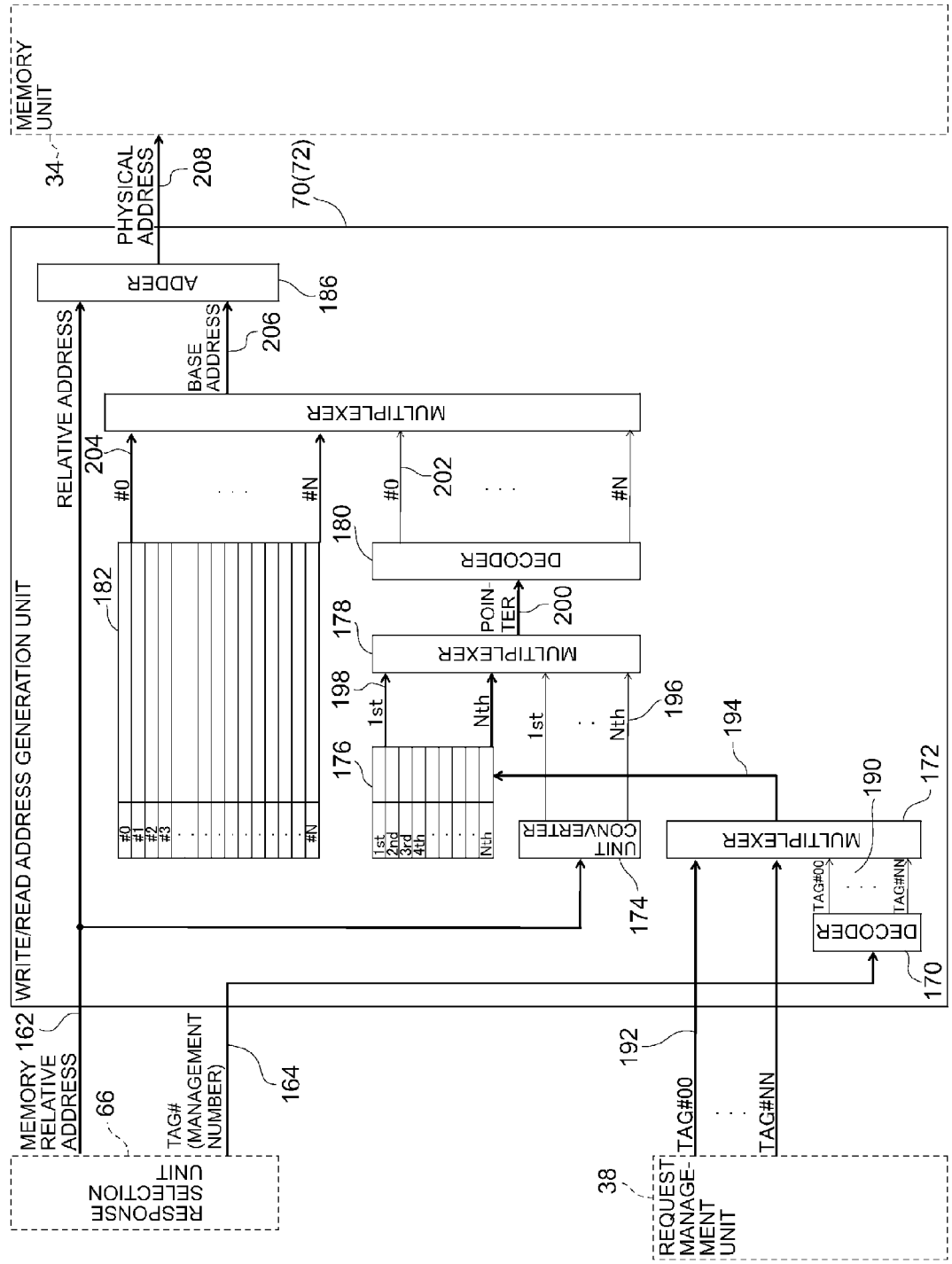
FIG. 17 is a block diagram of a write address generation unit.

Next, the block diagram of the write address generation unit 70 is shown in FIG. 17.

In FIG. 17, the write address generation unit 70 is configured of a decoder 170, a multiplexer 172, a unit converter 174, a pointer set 176, a multiplexer 178, a decoder 180, a base address map 182, a multiplexer 184, and an adder 186.

The decorder 170 decodes a management number 164 from the response selection unit 66, and outputs the select signals 190 indicating TAG#00 to TAG#NN to the multiplexer 172. For example, [the decoder 170] takes in the management number 164 configured of a 3-bit digital signal, converts the management number 164 into a 1-bit select signal 190 indicating TAG#, and outputs the same to the multiplexer 172.

The multiplexer 172 takes in the signal 192 identifying the number stored in the pointer set 62 in the request management table 50 from the request management unit 38, converts the signal 192 selected by the select signal 190 into a signal 196 identifying the number stored in the pointer set 62, and registers the number stored in the pointer set 62 in the pointer set 176. Here, for example, if the signal 192 of TAG#00 is the signal identifying "5204" as a number stored in the pointer set 62, the information of "5204" is stored in the pointer set 176.

The unit converter 174 takes in the memory relative address 162 from the response selection unit 66 and, each time the memory relative address 162 reaches a set value, outputs signals 196 indicating the first to the N-th pointers to the multiplexer 178.

For example, if the memory relative address 162 is output as the addresses repeating the numbers from 0 to 8, the unit converter 174 firstly outputs a signal 196 indicating the first pointer while counting the numbers from 0 to 8, counts the value of the second memory relative address 162 after the memory relative address 162 reaches the set value=8, and outputs a signal 196 indicating the second pointer while the memory relative address 162 reaches the set value=8. Subsequently, similarly, each time the value of the memory relative address 162 reaches the set value=8, [the unit converter 174] sequentially outputs the signals 196 indicating the third to the N-th pointers.

The multiplexer 178 takes in the signals 198 indicating the numbers of the first to N-th pointers registered in the pointer set 176 and the signals 196 output from the unit converter 174, and sequentially outputs the pointers (the first to the N-th pointers) selected by the signals 196 as the signals 200 indicating the pointer numbers to the decoder 180.

For example, if the signals 196 indicating the first to the fourth pointers are sequentially output from the unit converter 174 and the signals 198 indicating "5", "2", "0", and "4" are sequentially output as the values of the first to the fourth pointers from the pointer set 176, from the multiplexer 178, a signal 200 indicating "5" is firstly output, and subsequently, a signal 200 indicating "2", a signal 200 indicating "0", and a signal 200 indicating "4" are sequentially output in 3-bit digital signals.

The decoder 180 decodes 3-bit signals 200 for example, and outputs the signals 202 corresponding to the pointers from #0 to #N to the multiplexer 184.

The base address map 182 is configured of the record of the same information as the information stored in the base address map 410. Specifically speaking, in the pointers from #0 to #N in the base address map 182, the information of the base addresses corresponding to the partitioned area numbers from 0 to N is stored. Subsequently, from the pointers from #0 to #N, the base addresses (head addresses) 204 from #0 to #N are output to the multiplexer 184.

The multiplexer 184 outputs the base address 204 selected by the signal 202 indicating the pointer #0 as the base address 206 to the adder 186. For example, if the signal 202 indicates the pointer #0, [the multiplexer 184] outputs the base address 204 #0 as the base address 206 to the adder 186.

The adder 186 adds the memory relative address 162 and the base address 206, and outputs the added address as the physical address 208 indicating the address (physical address) 420 of the buffer 34 to the buffer (memory unit) 34.

For example, if the base address 206 is "0x0020" and the memory relative address 162 is "2", "0x0022" is output as a physical address 208 from the adder 186. This physical address 208 shows the physical address of the location where the data must be actually stored in the partitioned area 36. Therefore, by using the physical address 208, the partitioned area 36 where the data must be stored can be selected from the plurality of partitioned areas 36.

It should be noted that, though the configuration of the write address generation unit 70 is explained in FIG. 17, the read address generation unit 72 can also be configured of the same components as those of the write address generation unit 70.

Next, the processing contents of the entire storage apparatus are explained in accordance with the flowchart in FIG. 18. This processing is started by the issuance of a read request from the access request source which is either the host computer or the storage device.

Firstly, if the host interface 26 or the drive interface 32 receives a read request from the access request source, the host interface 26 or the drive interface 32 issues the received read request (S30).

Next, if the request sending unit 24 receives the read request from the host interface 26 or the drive interface 32, the request sending unit 24 accepts the read request (S31). Here, the access request source can issue read requests sequentially without waiting for the arrival of read response data and perform the multiple read operation.

Next, each time a read request is accepted, the request sending unit 24 acquires a management number from the management number queue 54 in the request management unit 38 (S32), and manages the management number acquired from the management number queue 54 by causing the same to correspond to the read request.

Next, before storing the data of the length requested in the read request by the buffer 34, the request sending unit 24 takes in the information of the remaining capacity of the merging area from the merging area management queue 52 and confirms the remaining capacity of the merging area (the free capacity of the partitioned area 36) (S33). Here, if the capacity where the data requested in the read request can be stored [does not exist], that is, if the remaining capacity of the merging area is not sufficient, the request sending unit 24 waits until the remaining capacity of the merging area is recovered.

Next, if confirming that the sufficient capacity as the remaining capacity of the merging area exists, the request sending unit 24 performs the processing for converting the original management number added to the read request into the management number specific to the relay unit 14 as the read packet header conversion processing (S34), registers the read request information 60 added to the read request in the request management table 50 (S35), outputs the request information for securing the partitioned area 36 to the request management unit 38, and performs the reservation of the merging area (S36).

Next, on condition that the sufficient partitioned area 36 as the area capable of storing the data requested in the read request is allocated in the buffer 34, the request sending unit 24 sends the received read request as the read packet to the high-speed interface 22 (S37).

The high-speed interface 22 relays the read packet sent from the request sending unit 24, and sends the relayed read packet to the memory control unit 12 (S38).

Upon receiving the read packet from the high-speed interface 22, the memory control unit 12 performs the processing for making a read access to the memory 10 in accordance with the received read packet (S40).

Here, the memory control unit 12 reads the data requested in the read request from the memory 10, splits the read data into a plurality of units of read response data, transmits each of the split read response data as a completion packet to the high-speed interface 22 (S41).

Next, the high-speed interface 22 relays the completion packets transmitted from the memory control unit 12, and transmits the relayed completion packets to the response receiver unit 28 (S42).

Upon receiving the completion packets transmitted from the high-speed interface 22 (S43), the response receiver unit 28 identifies each of the received completion packets, couples the read response data added to the respective completion packets per management number, and stores the coupled read response data in the reserved partitioned area 36 among the partitioned areas 36 in the buffer 34 (S44). If all of the read response data corresponding to the respective management numbers is stored in the partitioned areas 36, [the response receiver unit 28] considers that the merging is completed and outputs the signal indicating that the merging is completed to the response relay unit 30.

Upon receiving the signal that the merging is completed from the response receiver unit 28, the response relay unit 30 accepts the signal that the merging is completed (S45), inquires with the request management unit 38 about the management number, acquires the tag number (TAG#) as the information related to the management number from the request management unit 38, and converts the acquired tag number (TAG#) into a management number (S46).

Next, the response relay unit 30 takes in the request information from the request management unit 38, generates the read response header in accordance with the stored original read request information 60 (S47), takes in the read data corresponding to the management number from the response receiver unit 28, adds the read data which is taken in to the read response header, and issues a read response. This read response data is transmitted from the response relay unit 30 to the access request source, and the access request source accepts the read response data (S49).

Meanwhile, after issuing the read response, the response relay unit 30 returns the management number to the request management unit 38 and also performs the processing for releasing the merging area (S50).

Subsequently, the request management unit 38 accepts the returned management number and also performs the processing for releasing the merging area (S51).

According to this embodiment, since the released partitioned areas 36 are allocated separately in the buffer 34, even in the case of the partitioned areas 36 whose physical addresses are non-sequential, on condition that the partitioned areas 36 of the sufficient capacity for storing the data of the length requested in the read request exists, it is possible to secure the partitioned areas 36 for storing the data of the length requested in the relevant read request and also transmit the subsequent read requests to the memory control unit 12.

Furthermore, according to this embodiment, even if the capacity of the data requested in the read request is small, the partitioned areas 36 in the buffer 34 can be utilized efficiently, and the use efficiency of the buffer 34 can be improved.

Furthermore, according to this embodiment, since a plurality of merging areas 432 as the virtual storage areas to which sequential virtual addresses are assigned are structured in the virtual memory 430 and the partitioned areas 36 of #4, #2, #0, and #5 are managed in one merging area 432, even if the physical addresses of the allocated partitioned areas 36 are non-sequential, all of the allocated partitioned areas 36 can be managed in one merging area 432 by the sequential virtual addresses.

It should be noted that the present invention is not limited to the above-mentioned embodiment and includes various variations. For example, although the above-mentioned embodiment is explained in detail for the ease of understanding the present invention, [the present invention is] not necessarily limited to comprise the entire explained configuration. Furthermore, for part of the configuration of the embodiment, the addition, deletion or replacement of other configurations may be performed.

Furthermore, each of the above-mentioned configurations, the functions, the processing units, the processing means and others may also be realized partially or entirely by hardware, for example, by designing the same in an integrated circuit or by other methods. Furthermore, each of the above-mentioned configurations, functions and others may also be realized by software by the processor interpreting the programs realizing the respective functions and performing the same. The information of the programs, tables and files realizing the respective functions can be recorded and retained in storage devices such as a memory, a hard disk, and an SSD (Solid State Drive) or recording media such as an IC (Integrated Circuit) card, an SD (Secure Digital) memory card, and a DVD (Digital Versatile Disc).

REFERENCE SIGN LIST

10 Memory, 12 Memory control unit, 14 Relay unit, 20, 22 High-speed interface, 24 Request sending unit, 26 Host interface, 28 Response receiver unit, 30 Response relay unit, 32 Drive interface, 34 Buffer, 36 Partitioned area, 38 Request management unit, 50 Request management table, 52 Merging area management queue, 54 Management number queue, 62 Response distribution unit, 64 Data coupling unit, 66 Response selection unit, 70 Write address generation unit, 72 Read address generation unit, 80 Remaining partitioned area counter, 82 Unit converter, 84 Memory, 86 Reserved pointer counter, 88 Unit converter, 90 Returned pointer counter, 92 Unit converter.

The invention claimed is:

1. A storage apparatus, comprising:
a memory for storing data;
a relay unit configured to communicate information with an access request source via a network and manage a buffer for storing the data stored in the memory; and
a memory control unit configured to communicate information with the relay unit via an interface and control data input/output processing to and from the memory,
wherein the relay unit is configured to split a storage area of the buffer into a plurality of partitioned areas, dynamically manage each of the plurality of partitioned areas, and, upon receiving a read request from the access request source, select and allocates one or more released partitioned areas among the plurality of partitioned areas as a partitioned area for storing data of a length requested in the received read request, and, on condition that one or more of the selected partitioned areas are allocated, send the received read request to the memory control unit, wherein, upon receiving the read request from the relay unit via the interface, the memory control unit is configured to read the data requested in the received read request from the memory, split the read data into a plurality of data, and sequentially send each of the split data to the relay unit via the interface, and wherein, upon sequentially receiving each of the data sent from the memory control unit, the relay unit is configured to sequentially store each of the received data in each of the allocated partitioned areas, and, on condition that all data requested in the read request are stored in each of the allocated partitioned areas, read the data from each of the allocated partitioned areas, and collectively send each of the read data as the read data to the access request source.

2. The storage apparatus according to claim 1, wherein, when the relay unit receives the read request from the access request source, the relay unit is configured to assign a management number which is unique to that read request for each of the received read requests, determine whether one or more separate partitioned areas have been allocated as the released partitioned area, and, on condition that one or more separate partitioned areas are allocated as the released partitioned area, send the read request to which with the management number was assigned to the memory control unit, and manage the one or more partitioned areas allocated as the released partitioned area by associating the one or more partitioned areas with the management number assigned to the read request, wherein the memory control unit is configured to add, to each of the split data, the management number which was assigned to the read request received from the relay unit and send the management number to the relay unit, and wherein the relay unit is configured to determines the management number which was added to each of the received data, sequentially store the data with the same determined management number among each of the received data in the one or more partitioned areas associated with the same management number as the determined management number, and, on condition that all data requested in the read request are stored in the one or more partitioned areas associated with the same management number as the determined management number, read the data from the one or more partitioned areas associated with the same management number as the determined management number, collectively send each of the read data as the read data to the access request source, and release each of the allocated partitioned areas.

3. The storage apparatus according to claim 1, wherein, when the relay unit receives the read request from the access request source, the relay unit is configured to determine whether one or more separate partitioned areas have been allocated as the released partitioned area, and, on condition that one or more separate partitioned areas are allocated as the released partitioned area, send the received read request to the or control unit.

4. The storage apparatus according to claim 1, wherein the relay unit is configured to manage each of the allocated partitioned areas by associating each of the allocated partitioned areas with a plurality of physical addresses which are sequential in each of the partitioned areas and which show an actual virtual location of each of the received data, and manage the plurality of physical addresses of each of the allocated partitioned areas as a whole by associating the plurality of physical addresses with a plurality of virtual addresses which are sequential in one virtual merging area.

5. The storage apparatus according to claim 1, wherein the relay unit includes:

a reservation counter for calculating a number of partitioned areas required for storing data of a length requested in the received read request;

a release counter for calculating a number of partitioned areas which are released among the plurality of partitioned areas; and a remaining partitioned area counter for calculating a number of remaining partitioned areas from the difference between the calculated value of the reservation counter and the calculated value of the release counter, wherein, when the calculated value of the remaining partitioned area counter is a positive value, one or more of the partitioned areas of a number corresponding to the calculated value of the reservation counter are selected and allocated among the plurality of partitioned areas.

6. The storage apparatus according to claim 1, wherein the relay unit includes:

a number storage memory for storing a partitioned area number corresponding to a released partitioned area among the partitioned area numbers which respectively identify the plurality of partitioned areas;

a reservation counter for calculating the number of partitioned areas required for storing data of a length requested in the received read request and selecting, from the number storage memory, the plurality of partitioned area numbers corresponding to the calculated value as the reserved partitioned area number; and a return counter for calculating, on condition that each of the allocated partitioned areas is released, the number of each of the released partitioned areas and registering the partitioned area number of each of the released partitioned areas as the partitioned area number to be returned in the number storage memory, wherein the plurality of partitioned areas corresponding to the plurality of partitioned area numbers selected by the reservation counter are managed as the one or more of the allocated partitioned areas.

7. The storage apparatus according to claim 6, wherein the relay unit is configured to associate and manage the plurality of partitioned areas numbers corresponding to each of the partitioned areas and the plurality of physical addresses which are sequential in each of the partitioned areas, and manage the plurality of physical addresses corresponding to the plurality of partitioned area numbers selected by the reservation counter and which are the plurality of physical addresses of each of the allocated partitioned areas as a whole by associating the plurality of physical addresses with a plurality of virtual addresses which are sequential in one virtual merging area.

8. A data control method of a storage apparatus comprising a memory for storing data, a relay unit for communicating information with an access request source via a network and managing a buffer for storing the data stored in the memory, and a memory control unit for communicating information with the relay unit via an interface and controlling data input/output processing to and from the memory, the data control method comprising:

a step of the relay unit splitting a storage area of the buffer into a plurality of partitioned areas, and dynamically managing each of the plurality of partitioned areas;

a step of the relay unit selecting and allocating, upon receiving a read request access request source, one or more released partitioned areas among the plurality of partitioned areas as a partitioned area for storing data of a length requested in the received read request;

a step of the relay unit sending, on condition that one or more of the selected partitioned areas are allocated, the received read request to the memory control unit;

a step of the memory control unit reading, upon receiving the read request from the relay unit via the interface, the data requested in the received read request from the memory;

a step of the memory control unit splitting the read data into a plurality of data;

a step of the memory control unit sequentially sending each of the split data to the relay unit via the interface;

a step of the relay unit sequentially storing, upon sequentially receiving each of the data sent from the memory control unit, each of the received data in each of the allocated partitioned areas;

a step of the relay unit reading, on condition that all data requested in the read request are stored in each of the allocated partitioned areas, the data from each of the allocated partitioned areas; and a step of the relay unit collectively sending each of the read data as the read data to the access request source.

9. The data control method of a storage apparatus according to claim 8, the data control method comprising:

a step of the relay unit assigning, when the relay unit receives the read request from the access request source, a management number which is unique to that read request for each of the received read requests, and determining whether one or more separate partitioned areas have been allocated as the released partitioned area;

a step of the relay unit sending, on condition that one or more separate partitioned areas are allocated as the released partitioned area, the read request to which with the management number was assigned to the memory control unit, and managing the one or more partitioned areas allocated as the released partitioned area by associating the one or more partitioned areas with the management number assigned to the read request;

a step of the memory control unit adding, to each of the split data, the management number which was assigned to the read request received from the relay unit and sends the management number to the relay unit;

a step of the relay unit determining the management number which was added to each of the received data;

a step of the relay unit sequentially storing the data with the same determined management number among each of the received data in the one or more partitioned areas associated with the same management number as the determined management number;

a step of the relay unit reading, on condition that all data requested in the read request are stored in the one or more partitioned areas associated with the same management number as the determined management number, the data from the one or more partitioned areas associated with the same management number as the determined management number; and a step of the relay unit collectively sending each of the read data as the read data to the access request source, and releasing each of the allocated partitioned areas.

10. The data control method of a storage apparatus according to claim 8, the data control method comprising:

a step of the relay unit determining, when the relay unit receives the read request from the access request source, whether one or more separate partitioned areas have been allocated as the released partitioned area; and a step of the relay unit sending, on condition that one or more separate partitioned areas are allocated as the released partitioned area, the received read request to the memory control unit.

11. The data control method of a storage apparatus according to claim 8, the data control method comprising:

a step of the relay unit managing each of the allocated partitioned areas by associating each of the allocated partitioned areas with a plurality of physical addresses which are sequential in each of the partitioned areas and which show an actual virtual location of each of the received data, and managing the plurality of physical addresses of each of the allocated partitioned areas as a whole by associating the plurality of physical addresses with a plurality of virtual addresses which are sequential in one virtual merging area.

12. The data control method of a storage apparatus according to claim 8, wherein the relay unit includes a reservation counter for calculating the number of partitioned areas required for storing data of a length requested in the received read request, a release counter for calculating the number of partitioned areas which are released among the plurality of partitioned areas, and a remaining partitioned area counter for calculating the number of remaining partitioned areas from the difference between the calculated value of the reservation counter and the calculated value of the release counter, and the data control method comprising:

a step of the relay unit selecting and allocating, when the calculated value of the remaining partitioned area counter is a positive value, one or more of the partitioned areas of a number corresponding to the calculated value of the reservation counter among the plurality of partitioned areas.

13. The data control method of a storage apparatus according to claim 8, wherein the relay unit includes a number storage memory for storing a partitioned area number corresponding to a released partitioned area among the partitioned area numbers which respectively identify the plurality of partitioned areas, a reservation counter for calculating the number of partitioned areas required for storing data of a length requested in the received read request and selecting, from the number storage memory, the plurality of partitioned area numbers corresponding to the calculated value as the reserved partitioned area number, and a return counter for calculating, on condition that each of the allocated partitioned areas is released, the number of each of the released partitioned areas and registering the partitioned area number of each of the released partitioned areas as the partitioned area number to be returned in the number storage memory, the data control method comprising:

a step of the relay unit managing the plurality of partitioned areas corresponding to the plurality of partitioned area numbers selected by the reservation counter as the one or more of the allocated partitioned areas.

14. The data control method of a storage apparatus according to claim 13, the data control method comprising:

a step of the relay unit associating and managing the plurality of partitioned areas numbers corresponding to each of the partitioned areas and the plurality of physical addresses which are sequential in each of the partitioned areas, and managing the plurality of physical addresses corresponding to the plurality of partitioned area numbers selected by the reservation counter and which are the plurality of physical addresses of each of the allocated partitioned areas as a whole by associating the plurality of physical addresses with a plurality of virtual addresses which are sequential in one virtual merging area.

* * * * *